(12) United States Patent
Maydanik

(10) Patent No.: US 12,077,257 B2
(45) Date of Patent: Sep. 3, 2024

(54) OCEAN CLEANUP AUTONOMOUS SYSTEM (OCAS)

(71) Applicant: Boris Maydanik, University Park, MD (US)

(72) Inventor: Boris Maydanik, University Park, MD (US)

(*) Notice: Subject to any disclaimer, the term of this patent is extended or adjusted under 35 U.S.C. 154(b) by 495 days.

(21) Appl. No.: 17/105,778

(22) Filed: Nov. 27, 2020

(65) Prior Publication Data

US 2021/0214055 A1 Jul. 15, 2021

Related U.S. Application Data

(60) Provisional application No. 62/941,416, filed on Nov. 27, 2019.

(51) Int. Cl.
| | |
|---|---|
| *B63B 35/32* | (2006.01) |
| *B07B 1/00* | (2006.01) |
| *B60L 8/00* | (2006.01) |
| *B63B 1/04* | (2006.01) |
| *B63B 35/00* | (2020.01) |
| *B63B 39/00* | (2006.01) |
| *E02B 15/08* | (2006.01) |
| *E02B 15/10* | (2006.01) |
| *E02F 5/28* | (2006.01) |

(52) U.S. Cl.
CPC ............ *B63B 35/32* (2013.01); *B07B 1/005* (2013.01); *B60L 8/00* (2013.01); *B60L 8/006* (2013.01); *B63B 1/04* (2013.01); *B63B 39/00* (2013.01); *E02B 15/0814* (2013.01); *E02B 15/104* (2013.01); *E02F 5/28* (2013.01); *B60L 2200/32* (2013.01); *B63B 2035/007* (2013.01)

(58) Field of Classification Search
CPC ..... B63B 35/32; E02B 15/104; E02B 15/046; E02F 5/28; B60L 2200/32
See application file for complete search history.

(56) References Cited

U.S. PATENT DOCUMENTS

| | | | | |
|---|---|---|---|---|
| 3,539,048 A | * | 11/1970 | Pearson ................ | E02B 15/046 210/242.3 |
| 3,945,508 A | * | 3/1976 | Colin ..................... | B63B 27/18 212/274 |
| 11,008,076 B2 | * | 5/2021 | Gordon ................. | B64U 80/84 |

FOREIGN PATENT DOCUMENTS

| | | | |
|---|---|---|---|
| CN | 201865088 U | * | 6/2011 |
| KR | 102031828 B1 | * | 10/2019 |

* cited by examiner

*Primary Examiner* — Anthony D Wiest
(74) *Attorney, Agent, or Firm* — Womble Bond Dickinson (US) LLP

(57) ABSTRACT

Systems and methods for cleaning and/or removal of ocean garbage are provided. The system includes a cleanup autonomous vessel (CAV) for collecting garbage, an autonomous tugboat (AT) for moving a large ocean container (LC), and a sorting machine (SM) and for sorting garbage. The system may also include an autonomous boat (AB) for transferring garbage from the CAV to the SM and for supplying fuel from the AT to the CAV. The system further includes regular ocean vessels (ROV) for moving the LC to different location. The CAV, AT, AB, LC, and ROV may operate in conjunction with a bidding process.

11 Claims, 20 Drawing Sheets

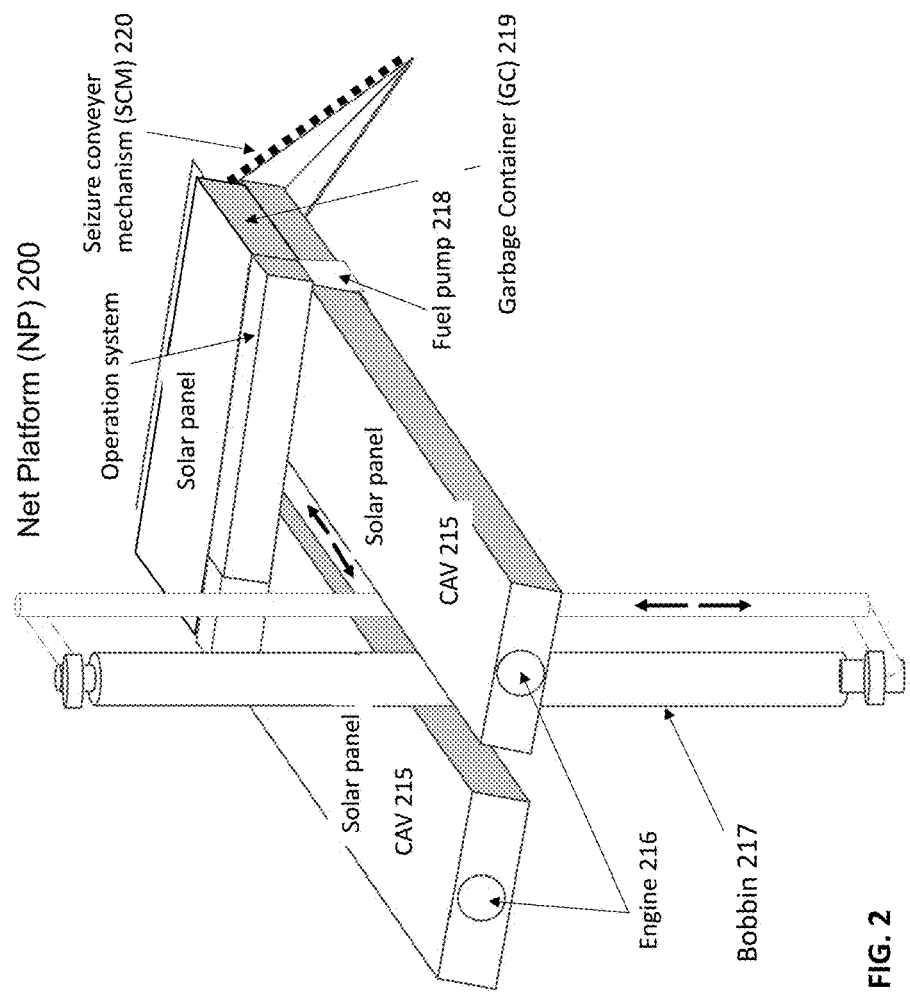
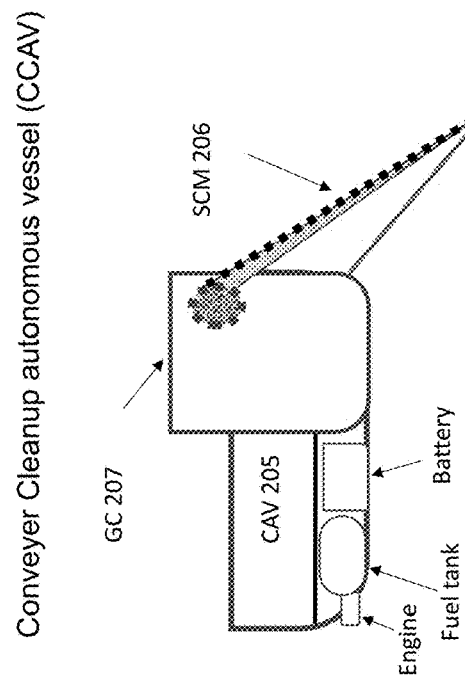
FIG. 2

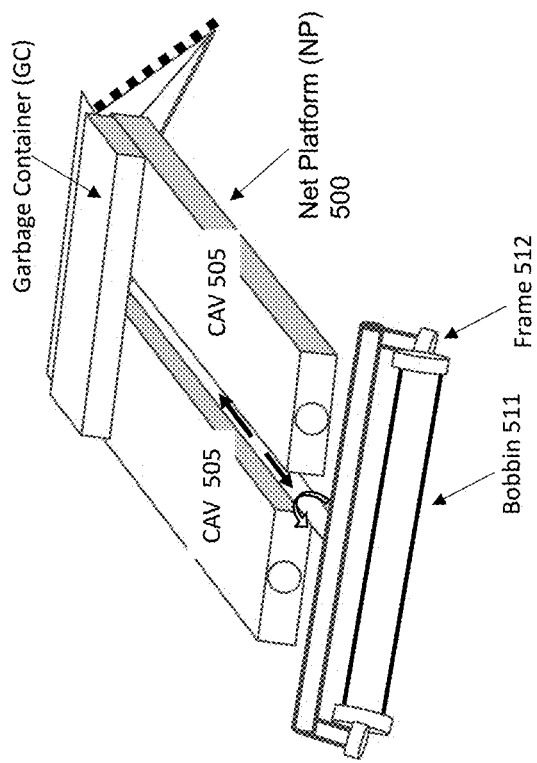
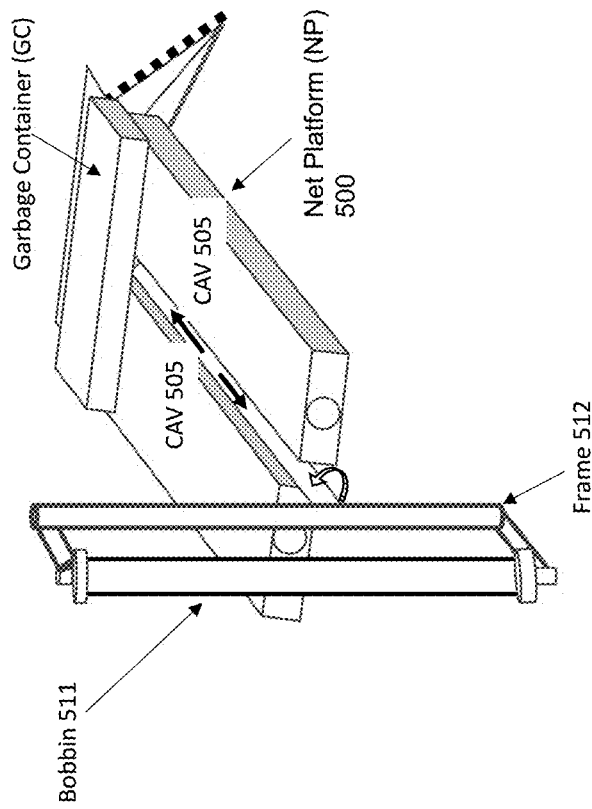
FIG. 5

FIG. 17 Transferring garbage from NPs to SM by AB

Data and Physical Interactions

OCEAN CLEANUP AUTONOMOUS SYSTEM (OCAS)

CROSS REFERENCE TO RELATED APPLICATIONS

This application claims the benefit of U.S. Provisional Patent Application No. 62/941,416, filed on Nov. 27, 2019. The disclosure of the above-referenced application is hereby incorporated by reference in its entirety.

TECHNICAL FIELD

Aspects of the present disclosure relate to various systems and methods for cleaning and/or removal of ocean garbage.

BACKGROUND

The world population generates millions tons of plastic waste per year. For example, the United States generates 10.5 million tons of plastic waste per year, but approximately 1-2% of this plastic waste is recycled. An estimated 14 billion pounds of trash is dumped in the world's oceans every year and the majority of that trash is plastic. Plastic bags and other plastic waste/garbage thrown into the ocean kill as many as 1 million sea creatures every year. Various research indicates there may be six times more plastic waste than phytoplankton by weight, and there may be fifty times more plastic waste than zooplankton by weight. Over half of the plastic/garbage may be smaller than an inch in size. The plastic garbage may be consumed by sea life and may make their way into the human food supply. The plastic garbage may form large patches or islands of garbage. These patches of garbage may be referred to as ocean garbage patches. These ocean garbage patches may be hundreds or even thousands of meters wide. These ocean garbage patches are growing rapidly and poisoning may living species throughout the food chain. Plastics may absorb organic pollutants like toxic sponges, concentrating the poisons and finding their way into the different levels of the food chain, from fish to humans.

SUMMARY

Some embodiments disclosed herein provide a system which may operate autonomously to collect/accumulate garbage, separate/sort the garbage into plastic and other types of garbage, and deposit the garbage into large ocean containers (LCs). The LCs with sorted garbage containers may be pulled, towed, moved, etc., to a port of destination by regular ocean vessels through the bidding procedure. The system (e.g., autonomous system) may be referred to as the ocean cleanup autonomous system (OCAS). The OCAS may include multiple components and/or systems (discussed in more detail below), which complement each other. The design of the OCAS may minimize/reduce the cost for commercial cleanup the ocean garbage patches.

In one embodiment, the OCAS may be an autonomous system that is configured to clean up ocean garbage patches. The OCAS may reduce the cost of operation by reducing and/or removing human involvement in the process of collecting garbage from the ocean. This allows the OCAS and/or systems of the OCAS to operate for long periods of time in remote areas of various oceans.

In one embodiment, the OCAS may include various types of vehicles/vessels. These vehicles/vessels may include standard and interchangeable mechanisms and equipment. One type of vehicle may be a cleanup autonomous vessel (CAV) for collecting garbage. Another type of vehicle may be an autonomous tugboat (AT) for moving a large ocean container (LC). Another type of system may be a sorting machine (SM) and for sorting garbage. Another type of vehicle may be an autonomous boat (AB) for transferring garbage from the CAV to the SM and for supplying fuel from the AT to the CAV. The standardization and interchangeability of mechanisms and equipment allows the CAV to be modified for specific conditions of ocean garbage patches and reduce the cost of replacing/fixing different systems of the OCAS.

In one embodiment, locating the sorting machine (SM) at the ocean garbage patches may reduce the cost of delivery sorted plastic garbage by avoiding of delivery unwanted garbage. Accumulation of sorted garbage in the large ocean containers (LC) may reduce the cost of delivery by delivering the garbage in larger volumes/quantities. The large ocean containers may reduce the cost for accumulation and delivery of sorted plastic garbage from ocean garbage patches.

The OCAS system may deliver LCs to destinations by using a bidding process with regular ocean vessels which are moving in their own routes near the destinations. The bidding process can significantly reduce the cost of delivery to the destination by regular ocean vessels moving along their own routes near the LC's destination. The coordination of the delivery with ocean vessels may be accomplished by the bidding process. The OCAS may include standard and interchangeable mechanisms and equipment for collecting the garbage from the surface, deep water and bottom of ocean. The OCAS may include mechanisms and equipment for collecting different types of sorted plastic garbage ranging from microplastic to large pieces of plastic garbage. The systems and/or components of the OCAS may receive energy or power from various sources. For example, power may be received from solar panels, generation of electricity from waves, from wind, from fuel, from batteries, etc. The energy systems of the vessels/vehicles of the OCAS may allow them to operate autonomously to collect garbage in LCs while reducing or minimizing cost.

BRIEF DESCRIPTION OF DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 is a diagram illustrating a cleanup autonomous vessel (CAV) and a net platform (NP), in accordance with one or more embodiments of the disclosure.

FIG. 5 is a diagram illustrating a device for deploying a net at various orientations, in accordance with one or more embodiments of the disclosure.

DETAILED DESCRIPTION

Figure 1:
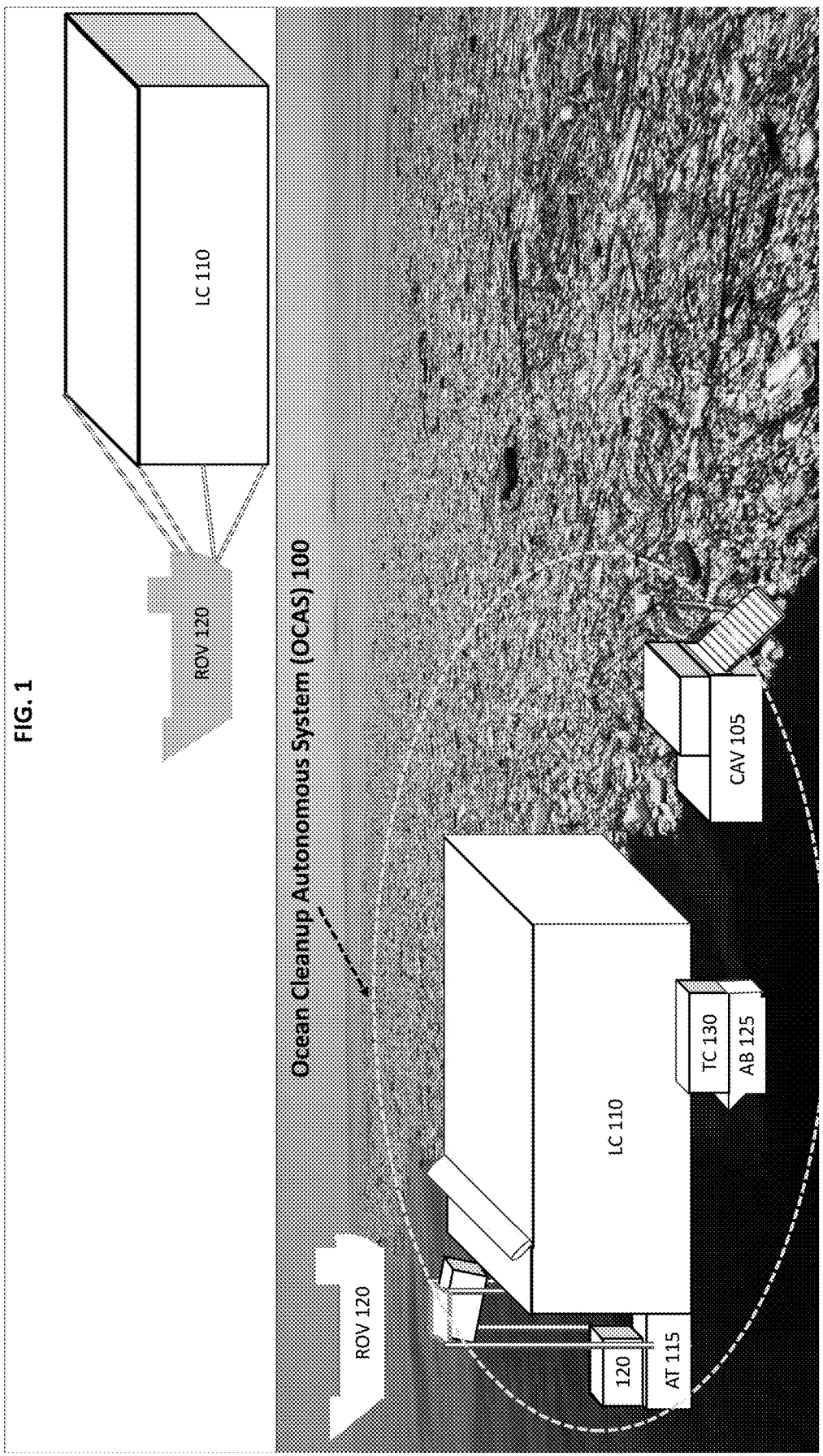
FIG. 1 is a diagram illustrating an example of ocean cleanup autonomous system (OCAS) that includes various other systems, in accordance with one or more embodiments of the disclosure.

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

The implementations, examples, and/or embodiments described herein relate to an interconnected system that includes mechanisms, equipment and an operations model, which may be used to collect and/or process garbage (e.g., waste, trash, refuse, etc.). The cleaning system may reduce the cost of accumulation, sorting, and/or recycling garbage on a commercial level. A lower cost to clean garbage from the ocean may be achieved by accumulating sorted garbage autonomously without involving people and by the processes disclosed herein. The OCAS may be able to improve, streamline and/optimize the processes for accumulating, sorting, and/or recycling garbage using various current and/or next generation technologies. The OCAS may be equipped to accumulate the different plastic garbage, from microplastic to large pieces of plastic as well. The OCAS may also be used for various other purposes, such as cleaning up petroleum leaks and another potential pollution, fishing, ocean farming, accumulation of different ocean products and minerals, research, intelligence and military operations.

Each particular condition at garbage patch may determine the optimal approach for collection of garbage. For exemplar, a seizure conveyer mechanism (SCM) may be used in areas where are debris forms floating islands/patches on the ocean surface. In another example, two net platforms (NPs) with nets in a vertical position may be used in the areas where the garbage has less concentration on the ocean surface. In a further example, NPs with nets in a horizontal position may be used at the areas where the garbage is located below the ocean surface. NPs may also be used to collect garbage from the bottom of the ocean or to collect microplastics.

As discussed above, plastic waste is a major problem for the environment. An automated system for cleaning up the garbage from the oceans, lakes, beaches, etc., would be very useful and would help to improve the conditions of our natural environments. The development of the OCAS may increase employment and job opportunities by creating additional manufacturing opportunities. It may be difficult to have people operate and/or live in ocean environment. Because OCAS disclosed herein may be autonomous, the provide may opportunities for people to explore and clean the oceans, which cover 80% of the planet.

The reduced cost of the OCAS may be achieved due to various factors. The OCAS may be able to accumulate garbage autonomously without human involvement for an extended period of time. The separation of garbage directly at ocean garbage patches may save costs by avoiding the shipping unwanted garbage, such the wood and others, that may dissolve safely in ocean. The delivery LC with garbage by the regular ocean vessels, which are travelling on their regular routes near OCAS operation may save the cost of delivery separated plastic garbage. The standardization and interchangeability of some systems of the OCAS may also reduce the cost of repair. The OCAS may be a commercial solution for cleaning up plastic garbage from the ocean patches at a low and/or effective cost.

The following is a comparison of OCAS with the Ocean Cleanup Project, Netherlands. The concept of the Ocean Cleanup Project is to accumulate the plastic garbage in the net which is moving passively by the through the water via waves and current. The Ocean Cleanup Project is a passive collection apparatus that works by moving in tandem with the ocean's currents, taking advantage of the water's circular movement patterns, called gyres, that cause the trash to accumulate in the first place. The advantages of the OCAS compared with the Ocean Cleanup Project is presented in the table 1 below.

TABLE 1

|  | OCAS | Other Ocean Cleanup Systems/Methods |
| --- | --- | --- |
| Autonomous operation | Active | Passive |
| Ability to operation cleanup process for collection, sorting and accumulation of plastic garbage autonomously | YES | NO |
| Accumulation of sorting plastic garbage in container autonomously | YES | NO |
| Human involvement | 20% | 90% |
| Autonomous operation with NET | YES | NO |
| Accumulation of microplastic | YES | NO |
| Accumulation of garbage from the bottom of ocean and in deep water | YES | NO |
| Accumulation garbage in Container | Automatically by CAV | Manually by vessel's crew |
| Sorting garbage | Sorting in the area of garbage accumulation | Sorting in recycle plan which may located thousands miles from location of garbage in ocean |
| Delivery plastic garbage | Special competition bidding management for pull LC with sorted plastic garbage to port of destination by any ocean vessel shipping in area of OCAS's operation | Requires manually accumulate all garbage inside of Net area and delivery unsorted garbage for sorting to hundreds miles |
| Multitasks | Allows to accumulate any type if sorted garbage from microplastic to large garbage | Allows to accumulate only specific size of unsorted garbage from ocean surface by passive net |
| Number of tasks for complete recycle process | 5 | 10 |

FIG. 1 is a diagram illustrating an example of ocean cleanup autonomous system (OCAS) 100 that includes various other systems (e.g., devices, apparatus, machines, etc.), in accordance with one or more embodiments of the disclosure. The systems in the OCAS 100 are merely examples and other systems may be included in the OCAS 100. The OCAS 100 includes a cleaning autonomous vehicle (CAV) 105. The CAV 105 may be a system, such as an autonomous boat. The CAV may collect, grab, or physically remove ocean garbage from the ocean (e.g., from the surface of the water, from within the water, etc.). Although one CAV 105 is illustrated in FIG. 1, the OCAS 100 may include any number of CAVs.

The OCAS 100 also includes a container (LC) 110 for the accumulation and/or storage of sorted garbage. The LC 110 may be referred to as an ocean container. The OCAS 100 may include any number of LCs. After the LC 110 has been filed with sorted plastic garbage, the LC 110 may be exchanged with another LC (e.g., an empty LC). LC 110 may be attached to another vessel or vehicle until the LC 110 is filled. For example, the LC 110 may be attached to the autonomous tugboat (AT) 115, a regular ocean vehicle (ROV) 120, etc.

The OCAS 100 also includes an autonomous tugboat (AT) 115 that may tug, tow, push, etc., the LC 110. In other embodiments, the OCAS 100 may include any number of ATs. However, fewer ATs may reduce the cost of the OCAS 100.

The AT 115 also includes a sorting mechanism (SM) 120. The SM 120 may be an autonomous system that may sort the garbage collected by the CAV 105. In other embodiments, the OCAS 100 may include any number of SMs. However, fewer SMs may reduce the cost of the OCAS 100. The SM 120 may be attached to another vehicle or vessel (e.g., another system). For example, the SM 120 may be attached to the AT 115 of the CAV 105. Attaching the SM 120 to the CAV 105 may allow the CAV 105 to sort garbage prior to depositing the garbage into LC 110. This may allow the value of the garbage contained within LC 110 to be increased (e.g., allows for the selection of a desired type of garbage, such as plastic).

The OCAS 100 also includes an autonomous boat (AB) 125 for transferring containers with garbage from the CAV 105 to the SM 120 and for delivering fuel (e.g., gas, batteries, etc.) from AT 115 to the CAV 105. The OCAS 100 may include any number of ABs. The AB 125 may allow the CAV 105 to operate without interruptions while at some distance from SM 120. For example, rather than having the CAV 105 travel back to the SM 120 to drop off garbage, the AB may transport the garbage to the SM 120. A temporary container (TC) 130 may be attached to the AB 125 to transport the garbage to the SM 120.

The ROV 120 may deliver (e.g., tow, move, etc.) empty LCs with to different locations. For example, the ROV 120 may deliver an empty LC 110 to a garbage patch in the ocean. The ROV 120 may also deliver LCs that are full of garbage (e.g., full LCs with sorted plastic garbage) to a destination (e.g., a port) while traveling along a route. For example, each ROV 120 may already have a predefined travel route. The ROV 120 may pick up any LCs that are along the predefined travel route or within a threshold distance of the travel route. The ROV 120 may be attached to the LC 110 (e.g., via ropes, cables, etc.) as illustrated in the top right of FIG. 1.

The ROV 120, AT 115, AB 125, and CAV 105 may each include various devices, systems, equipment, etc. For example, one or more of the ROV 120, AT 115, AB 125, and CAV 105 may include communication and navigation equipment. In another example, one or more of the ROV 120, AT 115, AB 125, and CAV 105 may include an engine, fuel tanks, batteries (e.g., electric batteries), etc. In a further example one or more of the ROV 120, AT 115, AB 125, and CAV 105 may include equipment, systems, mechanisms, etc., for producing renewable energy from solar, wind and waves. In addition, one or more of ROV 120, AT 115, AB 125, and CAV 105 may include containers or storage areas for collecting, storing, or holding garbage. One or more of the ROV 120, AT 115, AB 125, and CAV 105 may include different systems or mechanisms for collecting ocean garbage.

In one embodiment, the OCAS 100 may provide the ability to autonomously collect, sort and store the sorted garbage in LC 110 for further delivery to destination point. Sorting garbage at the source (e.g., at the garbage patch on the ocean) may enable a bidding process to shorten the time to collect and deliver sorted garbage. The OCAS 100 may also utilize renewable energy to power autonomous the systems, vehicles, etc. When the gathered garbage is transported as secondary cargo, further transportation may also be arranged via the bidding process. The combination of three types of autonomous boats (CAV 105, AT 115, and AB 125) along with SM 120 (e.g., an autonomous garbage sorter) and LC 110 may minimize or reduce the cost of cleaning ocean plastic garbage. Also, OCAS 100 may allow for more valuable types of garbage to be selectively collected. For example, the CAV 105, SM 120, and LC 110 may be configured to collect recyclable metals, which may have more monetary value than plastic.

FIG. 2 is a diagram illustrating a cleanup autonomous vessel (CAV) 205 and a net platform (NP) 200, in accordance with one or more embodiments of the disclosure. As illustrated in FIG. 2, CAV 205 may be an autonomous marine vessel with systems for collecting ocean garbage, as described in FIG. 1. The CAV 205 includes a seizure conveyer mechanism (SCM) 206 capable of removing ocean garbage from ocean and a garbage container (GC) 207 for accumulation of ocean garbage. The CAV 205 may include mechanisms that are similar to existing machines/systems designed to clean garbage from other environments, such as rivers, other bodies of water, etc. For example, the CAV 205 and/or the SCM 206 may include a plastic sheet with holes, a metal lattice, or an engineered membrane material for selectively passing targeted molecules or liquids.

The CAV 205 may also include many additional mechanisms and equipment to allow for autonomous operation within an OCAS. For example, the CAV 205 may include a navigation system which to allow for safe operation and self-identification within the OCAS. The CAV 205 may also include a communication system which allows information transfer between different systems of the OCAS (e.g., allows the CAV 205 to transmit and/or receive data from other systems of the OCAS). The CAV 205 may also include one or more energy supply systems (e.g., an engine, solar panels, a battery, etc.) which allows the CAV 205 to operate autonomously to collect garbage and deposit the garbage to an LC. The CAV 205 may receive the fuel for the engines and/or electric generators from an LC or AB. The CAV 205 may also receive or generate energy from renewable energy sources, such as solar panels, waves, wind turbines, batteries, fuel cells, piezo electronics.

Additionally, the CAV 205 may further include further mechanisms and equipment in other embodiments. For example, the CAV 205 include a vertical net to collect the ocean garbage autonomously from the surface to the bottom of ocean. In another example, the CAV 205 may include a membrane filter, an electrostatic precipitating filter with a metal plate that has holes, an articulating arm with grippers, etc., to collect the ocean garbage autonomously from microsized plastic to large size garbage. The CAV 205 may also include propulsion systems, or impellers to stabilize the position and/or location of the CAV 205 during different conditions, such as a storm. The CAV 205 may include sonar systems to identify locations where living animals. For example, the CAV 205 may use the sonar to identify schools of fish and other components of the OCAS may instruct the CAV 205 to navigate around the school of fish or to generate a noise to scare off the fish. In the OCAS, the CAV 205 may be capable of providing data to other components of the OCAS (e.g., a server computer) and the OCAS may communicate that data to all CAV in close proximity to CAV 250.

Net platform (NP) 200 is illustrated on the right side of FIG. 2. The NP 200 includes two CAVs 215. Each CAV 215 may include an engine 216 and a fuel pump 218. The NP 200 also includes a GC 219, SCM 220, and a bobbin 217. The NP 200 may selectively deploy garbage capture systems such as a bobbin 217 which hold a rolled net. Bobbin 217 may allow the net to be unrolled to collect garbage, as discuss in more detail below. Different portions of the net may have different hole sizes. The net may be deployed to concentrate, collect, and direct garbage to a the SCM 220. The SCM 220 may include a conveyor mechanism (e.g., a conveyor belt) to collect the garbage. Further, bobbin 217 may be attached to a frame to allow the net to be rotated and deployed from different positions. For example, the bobbin 217 may be unrolled to move net away from NP 200, or may be lowered under water to collect submerged garbage, or may be turned from a vertical to a horizontal position for collecting garbage in deep water (as described in FIG. 5).

The NP 200 may have a flatter structure (e.g., may be more spread out over the surface of water). This may provide the NP 200 with more stability and more resistant to being overturned or capsized by ocean waves during storms. Additionally, the flatter structure of the NP 200 allows equipment and mechanisms for producing renewable energy, a container for collecting garbage, etc., to be placed on the NP 200. Systems and mechanisms for collecting garbage maybe interchangeable. For example, a net with smaller holes may be exchanged for a net with large holes.

The CAVs 215 and/or NP 200 includes systems or mechanisms to receive data from other OCAS systems (e.g., from a server computer) and may alter ocean garbage collection (e.g., change operations) based on changing conditions in the ocean environment. For example, the NP 200 may be moved to a location that has a high density of ocean garbage, commonly called referred to a patches, garbage patches, garbage islands, etc.

Figure 3:
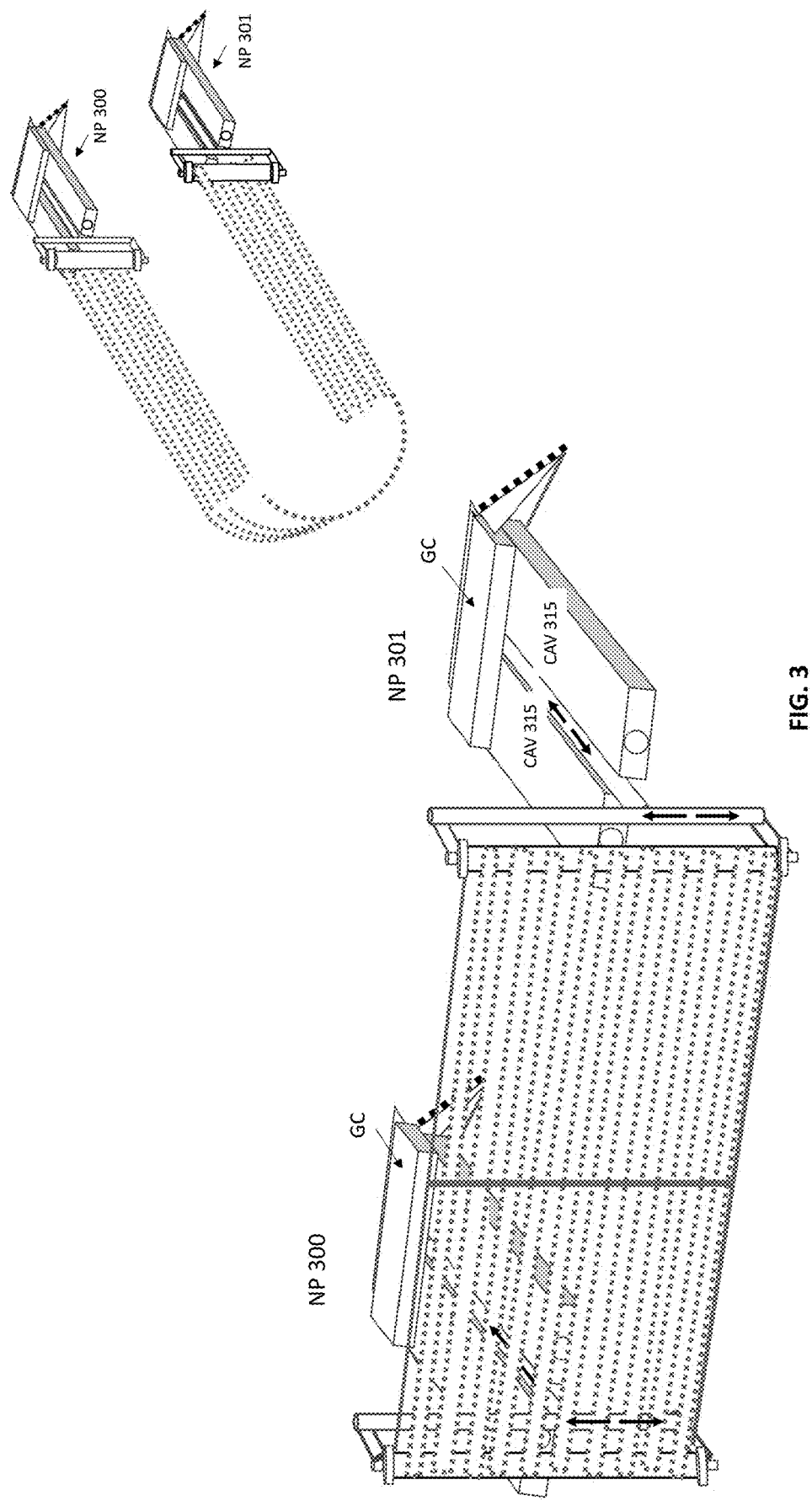
FIG. 3 is a diagram illustrating an example a method of collecting garbage on surface of ocean with multiple NPS, in accordance with one or more embodiments of the disclosure.

FIG. 3 is a diagram illustrating an example a method of collecting garbage on surface of ocean with multiple NPS, in accordance with one or more embodiments of the disclosure. As illustrated NP 300 and NP 301 may operate together by combining systems, equipment, and/or mechanisms. In one example, sensor data is shared from between NP 300 and NP 301, where NP 301 may not have the equipment (e.g., may not have sensors) available to measure received sensor data. In a second example, a first net from NP 300 is temporarily joined to a second net from NP 301. For example, the first bobbin of NP 300 may extend the first net. The second bobbin of NP 301 may extend the second net in a manner such that first net connects with second net automatically (e.g., as through actuated connectors, or friction entanglement). Both NP 300 and NP 301 can move forward and collect garbage from ocean surface using the joint net (e.g., the combination of the first net and the second net).

Figure 4:
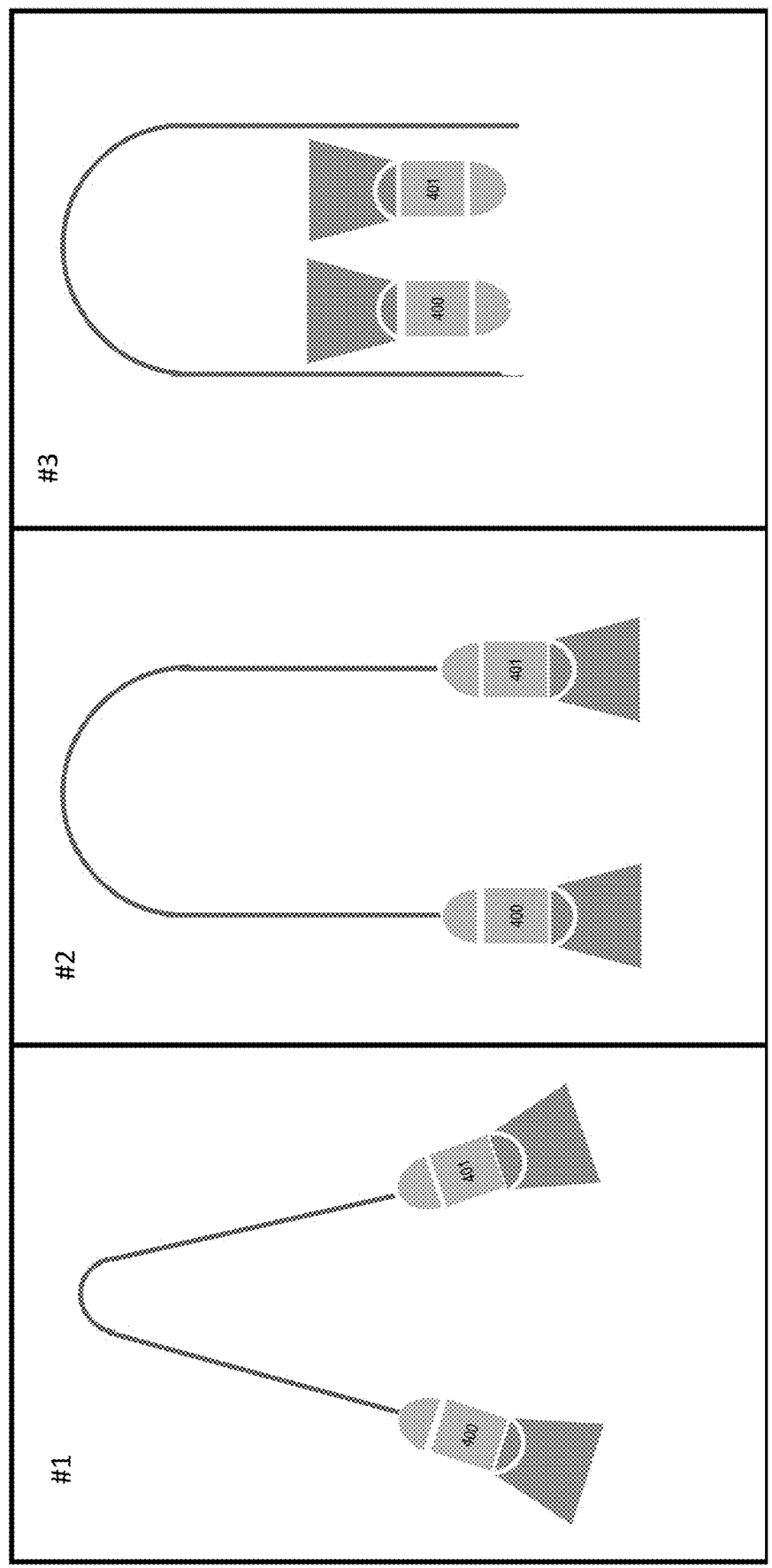
FIG. 4 is a diagram illustrating example method for operation/movement of a NP and a NP for accumulation and collection of ocean garbage from surface autonomously, in accordance with one or more embodiments of the disclosure

FIG. 4 is a diagram illustrating example method for operation/movement of a NP 400 and a NP 401 for accumulation and collection of ocean garbage from surface autonomously, in accordance with one or more embodiments of the disclosure. As discussed above, a first net of the NP 400 may be connected to a second net of the NP 401. Both the NP 400 and NP 401 may be able to move autonomously in the pattern illustrated in FIG. 4. For example, the NP 400 and NP 401 may coordinate with each other to move as illustrated in FIG. 4.

In part #1, The NP 400 and NP 401 may move towards ocean garbage (e.g., downwards in FIG. 4) to accumulate garbage. The combined nets of NP 400 and NP 401 may form a "V" shape as the nets are pulled through ocean garbage. The bobbins of NP 400 and NP 401 may allow the length of the combined nets to be increased or decreased as needed. For example, for a larger area, the bobbins may unfurl the nets to increase the length of the net. The changes to the length and/or position of the combined nets may be performed automatically (e.g., based on sensors or sensor data, such as digital images/video).

In part #2, the NP 400 and NP 401 move towards the ocean garbage in parallel to form a "U" shape with the combined nets. The combined nets may encompass the ocean garbage and increase the ocean garbage density relative to ocean surface area. The resistance the unrolling of the combined nets (e.g., the two nets) may indicate whether a sufficient amount of ocean garbage has been collected. For example, the more the nets unroll or unfurl, the more garbage has been collected. Various other devices may be used to determine whether a sufficient amount of ocean garbage has been collected. For example, proximity sensors, locators, laser range devises, sonar devices, load cells, strain gauges, etc., may be used.

In part #3, NP 400 and NP 401 may turn 180 degrees and move towards the inside of the combined nets (e.g., may move upwards in FIG. 4) to collect garbage. A first bobbin of NP 400 may retract the first net and a second bobbin of NP 401 may retract a second net. The two nets may move ocean garbage towards a first SCM of NP 400 and second SCM of NP 401.

In part #3, the NP 400 and NP 401 may collect and/or sort garbage more quickly and efficiently because the garbage is concentrated between the combined nets and the SCMs of the NP 400 and NP 401. This may allow the NP 400 and NP 401 to collect and sort garbage more quickly than if the NP 400 and NP 401 operate separately. As discussed above, each of NP 400 and NP 401 may include a SM and a GC. Each of NP 400 and NP 401 may use their respective SM to sort garbage and store the sorted garbage in their respective GC. The garbage stored in the GCs of NP 400 and NP 401 may be delivered to an SM of an AB, as discussed above. The NP 400 and NP 401 may repeat parts #1 through #3 to continuously (and autonomously) collect and sort garbage.

As discussed above, the length of the first net of the NP 400 and the second net of NP 401 may be automatically adjusted depending on the concentration of garbage in the water. The net may be on rollers or bobbins which may be unrolled to expand the net (e.g., increase the length of first net and second net, for example, up to 1000 feet). Furthermore, the bobbins may be rolled to retract first net and second net (e.g., decrease the length of first net and second net). For example, the length of first net and second net together may be to 2000 feet, or some other appropriate length.

Further, first net and second net may be configured to sink in water to a predetermined depth below the surface of the water (e.g., via weights or adjustable ballasts). Such capability allows the first net and second net to accumulate ocean garbage below the surface of the water which may be inaccessible to SCMs of the NP 400 and NP 401. For example, the net may sink up to 20 feet, or an appropriate depth below the surface of the water to accumulate less buoyant ocean garbage.

FIG. 5 is a diagram illustrating a device for deploying a net at various orientations, in accordance with one or more embodiments of the disclosure. The orientation of the net allows the NP 500 to collect ocean garbage from substantially different ocean locations. For example, vertical orientation of the net (as illustrated on the left side of FIG. 5) may be used to collect mostly surface ocean garbage. Alternatively, horizontal orientation of the net (as illustrated on the right side of FIG. 5) may collect mostly sub-surface ocean garbage up to the depth equal to the length of the net at a maximum deployment length.

The illustrated example details a device for holding a net wrapped around a bobbin. The bobbin may have cylinder shape an may be rotatably connected to a metal frame 512, such that bobbin (e.g., the cylinder) can be rotated to unwind and wind net around cylinder. Rotation of the bobbin may be accomplished with an electric motor, hydraulic motor, or pneumatic motor. Further, the metal frame 512 is attached (e.g., operatively connected the CAVs 505), such that metal frame 512 can be orientated in a vertical position or a horizontal position through the use of a second electric motor. Additionally, orientation of metal frame 512 may alternatively be accomplished with the use of hydraulic motors, pneumatic motors, hydraulic actuators, pneumatic cylinders, or other mechanical devices capable of moving metal frame 512 from vertical to horizontal. The frame stick with both ends of bobbin by hinges. That allows to spin the net from bobbin with electrical motor.

Figure 6:
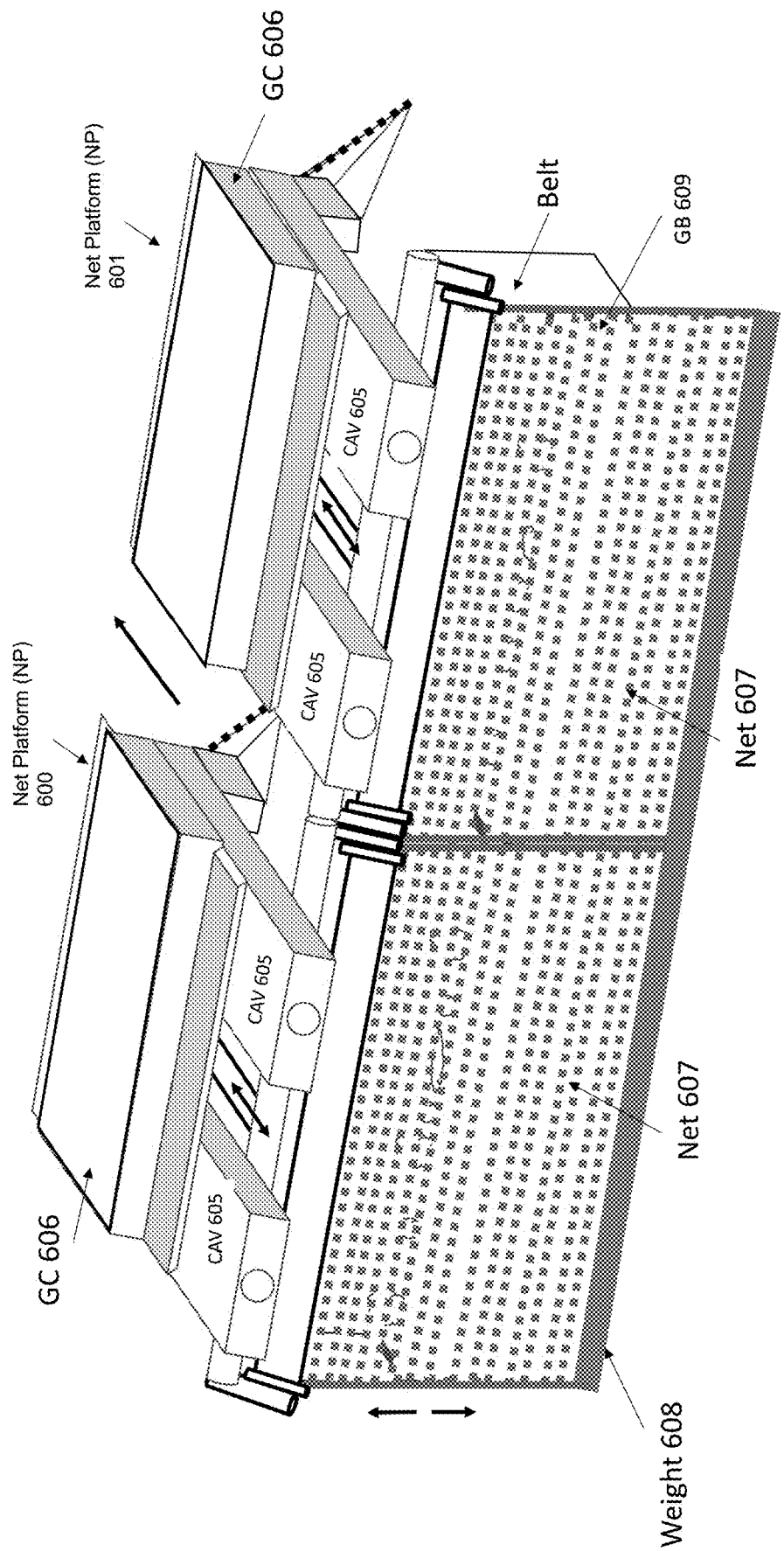
FIG. 6 is a diagram illustrating example of system for collecting garbage in deep water, in accordance with one or more embodiments of the disclosure.

FIG. 6 is a diagram illustrating example of system for collecting garbage in deep water, in accordance with one or more embodiments of the disclosure. The system includes NP 600 and NP 601. Each NP 600 and 601 includes CAVs 605. Each NP 600 also includes GC 606 and a net 607. The nets 607 are coupled together (e.g., attached, connected, etc.) and are deployed in a horizontal orientation, such that the nets 607 go downward in FIG. 6 as the nets 607 are unrolled. A weight 608 (or multiple weights) is attached to the nets 607 to cause the nets 607 to sink downwards as the nets 607 are unrolled, unwound, unfurled, etc. The may allow the nets 607 to deploy vertically down to a predetermined depth below the ocean surface. For example, the nets 607 may to unroll and extend up a distance/length of 1000 feet (or some other appropriate length) below the ocean surface. Additionally, weight 608 may contain air chambers with devices to adjust the amount of air in the chambers (e.g., a ballast), thereby altering buoyancy of weight 608 to assist in the winding or unwinding of the nets 607.

In other embodiments, more than two NPs may connect their respective nets which allows for wider net. As NP 600 and NP 601 move through the ocean (or some other body of water), garbage collects on the nets 607. Garbage collected within, near, or on first net and second net may be collected and stored in NP through the use of a garbage box (GB) 609. GB 609 may be attached to NP 600 and NP 601 and may move up/down. The motion of GB 609 may be controlled with belts, rope and pulleys, screw drives, chain drives, telescopic linear actuators, and other mechanical devices capable of moving GB 609 in close proximity to nets 607.

An actuator, or mechanism allows the GB 609 to move downwards into the ocean while maintaining substantial distance between GB 609 and ocean garbage collected within, near, or on the nets 607. For example, GB 609 moves downwards while maintaining up to 3 feet of distance (or some other appropriate distance) from the nets 607. The actuator, or mechanism may also move GB 609 closer to the nets 607. As the GB 607 is moved upwards towards NP 600 and NP 601 the garbage collected within, near, or on the nets 607 may be collected into the GB 609 and may be transported to NP 600 and NP 601. GB 609 may contain additional mechanisms to transfer garbage collected within, near, or on the nets 607 to the GB 609. Such mechanisms may include a flexible belt, bushes, combs, scrapers, etc., which use friction to move garbage from nets 607 to GB 609. Additionally, garbage collected within, near, or on nets 607 may be moved to GB 609 through the use of a localized increase in water flow. For example, a water pump located on GB 609 may increase water flow towards GB 609 (e.g., may pump water towards the GB 609), such that garbage collected within, near, or on nets 607 is moved to GB 609. Garbage moved to GB 609 may be stored in GCs 606 of the NP 600 and NP 601. In some embodiments, the movement of garbage from the nets 607 to the GB 609, and to the GCs 606 may be repeated in an autonomous manner.

Figure 7:
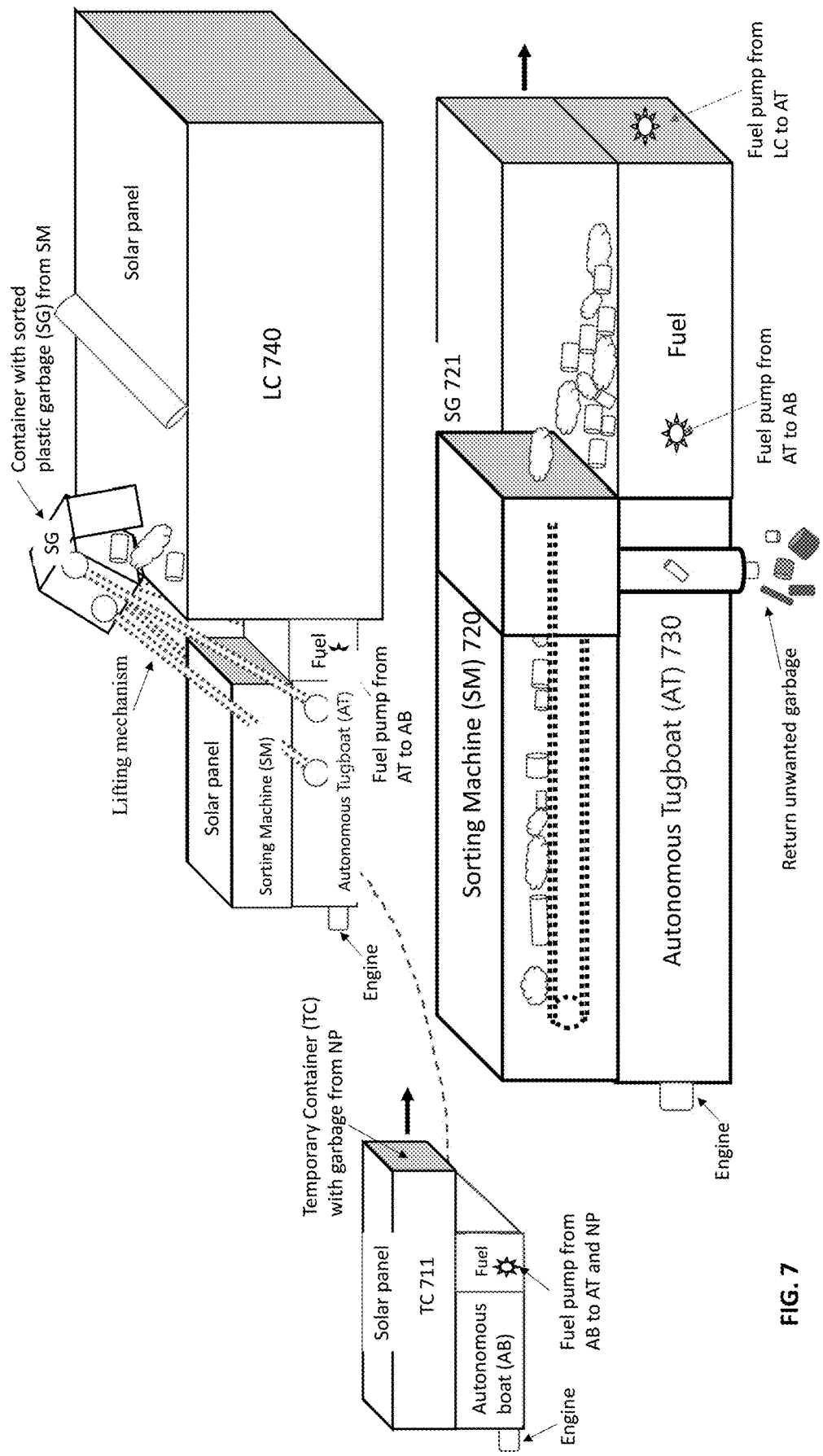
FIG. 7 is a diagram illustrating an example an autonomous sorting machine (SM) 720, in accordance with one or more embodiments of the present disclosure.

FIG. 7 is a diagram illustrating an example an autonomous sorting machine (SM) 720, in accordance with one or more embodiments of the present disclosure. The SM 720 may be located in close proximity to high density ocean garbage (e.g., garbage patches). The SM 720 is operatively connected to an autonomous tugboat (AT) 730. AT 730 may be capable of moving to and operatively connecting to a large ocean container (LC) 740. For example, the AT 730 may be instructed or controlled by a server of an OCAS to move to the LC 740. SM 720 may include multiple sorting systems for identifying different types of garbage and directing the identified garbage to a temporary holding container such as TC 711 or SG 721. AT 730 may also be capable of moving to and operatively connecting to a LC 740, such that LC 740 receives the sorted garbage, as directed by other systems (e.g., a server) of the OCAS.

Various types of existing sorting machines may be configured for use with the AT 730. For example, identification of garbage may be completed by a spectrophotometer, densitometer, or a camera-based vison system, etc. Further, directing the garbage to a temporary holding containers, such as SG 721, may be accomplished by a conveyor belt with various diverting mechanisms, robotic gripper arms, or chutes with variable paths to leading to one of multiple temporary storage containers.

In some embodiments, sorting the garbage at the location of collection provides several advantages. For example, sorting the garbage at the location where the garbage is collected may help avoid the accumulation of biodegradable garbage (e.g., garbage which may dissolve by itself in a short time without damage to ocean ecology). For example, wood products and other biodegradable material may be separated out from other garbage that may not be biodegradable or may be less biodegradable. Sorting the garbage at the location where the garbage is collected may also help avoid the accumulation of lower value garbage (e.g., garbage which may have lower monetary or resale value) which may impair the bidding process for transporting 740 LC to a destination port. Sorting the garbage at the location where the garbage is collected may also help enable garbage likely to cause significant damage to ocean ecology to be collected in a shorter time compared to collecting all ocean garbage. For example, non-biodegradable garbage may be identified, sorted and collected.

In one embodiment, the SM 720 may be constructed to resist failure due to environmental conditions, such as rust, salt water corrosion, etc. For example, water or weather resistant materials and coatings may allow the SM 720 to be less susceptible to the elements, such as water, salt water, wind, the sun, etc.

Figure 8:
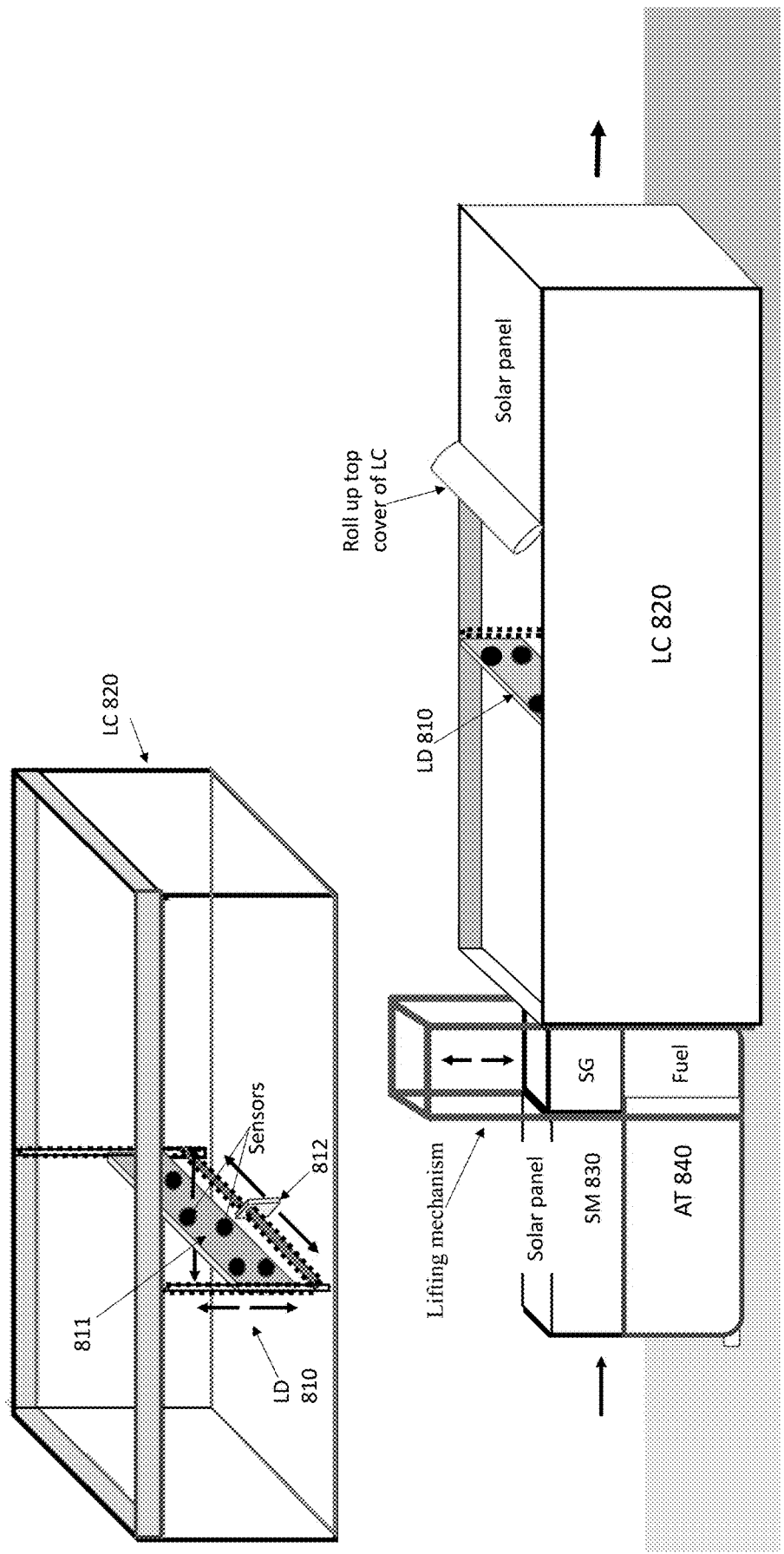
FIG. 8 is a diagram illustrating a leveling device (LD) within a LC in accordance with one or more embodiments of the present disclosure.

FIG. 8 is a diagram illustrating a Leveling Device (LD) 810 within a LC 820, in accordance with one or more embodiments of the present disclosure. The LD 810 may help with filling the LC 820 with garbage by levelling or distribute the garbage evenly throughout the LC 820. The LD 810 moves ocean garbage inside LC 820 to prevent a buildup of garbage in certain locations. The buildup of garbage may prevent the SM 830 from depositing garbage into the LC 820. Because the size of LC 820 may be large (e.g., 300 feet long by 80 feet wide by 20 feet tall), levelling the garbage as the garbage is deposited into the LC 820 may increase the amount of garbage that may be stored in the LC 820. Levelling the garbage in the LC 280 may allow the LC 820 to be filled completely, which maximizes the amount of garbage transported within LC 820, and which may also help achieve a lower cost for transporting garbage to a destination port.

In one example the LD 810 may include a metal plate 811 capable of moving along the length of the LC 820, such that movement of metal plate 811 contacts garbage and pushes garbage the length of LC 820. The metal plate 811 may be have a similar size as the width of said LC 820. The metal plate 811 may be oriented perpendicular to the length of LC 820. A second metal plate 812 may be attached to first metal plate 811. The second metal 812 is capable of moving along the first metal plate 811, such that movement of second metal plate 812 contacts garbage and pushes said garbage the width of LC 820 as the first metal plate 811 is moved along the length of the LC 820.

The metal plates 811 and 812 may be connected to a first metal frame capable of moving metal plates 811 and 812 in a vertical direction and along the length of the LC 820. Further, the metal frame may lift the metal plates 811 and 812 as level of garbage contained within LC 820 increases. The movement of the metal plates 811 and 812 and first metal frame may be carried out by various mechanical actuators, including but not limited to, electrical motors, electric actuators, hydraulic motors, and hydraulic actuators. Energy used to move the metal plates 811 and 812, and the metal frame may be provide from, batteries, capacitors, generators, solar panels, fuel cells which are may be attached to SM 830, AT 840, or LC 820. Additionally, the LD 810 may include various sensors (e.g., cameras, ultrasonic sensors, pressure sensors, etc.) such that the sensor data influences movement of the metal plates 811 and 812, and metal frame. Further it should be understood that the use of metal material is only an example and various other substantially ridged materials maybe used, such as polymer plastics.

Figure 9:
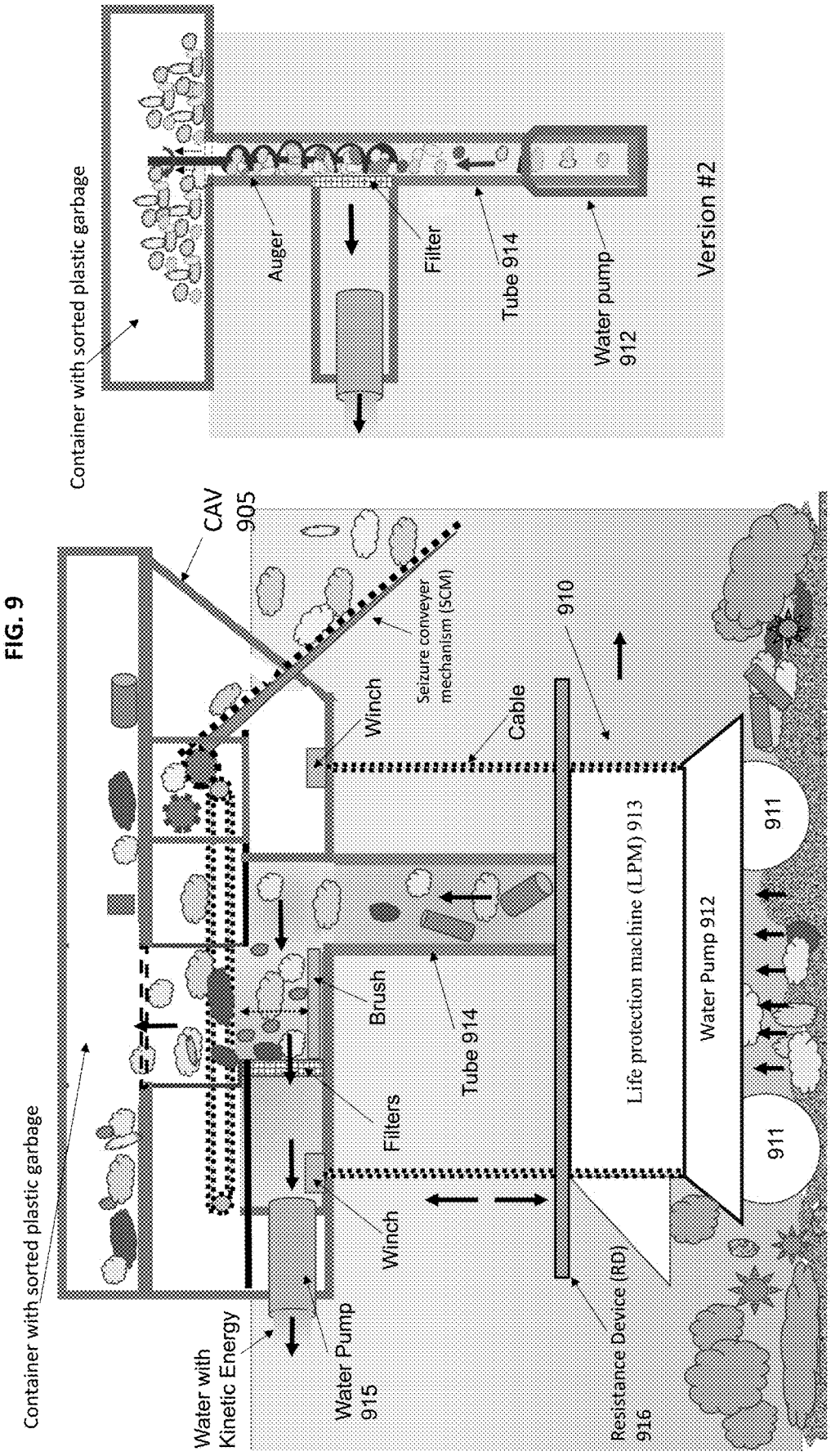
FIG. 9 is a diagram illustrating an example mechanism and method for collecting garbage, in accordance with one or more embodiments of the present disclosure.

FIG. 9 is a diagram illustrating an example mechanism and method for collecting garbage, in accordance with one or more embodiments of the present disclosure. The garbage may be collected from the bottom of an ocean (e.g., the bottom of the ocean). A first moving platform 910 may be attached or operatively connected to a CAV 905. The platform 910 may be lowered from the CAV 905 to the ocean floor. Lowering of the platform 910 may be accomplished by a variety of mechanisms including, cables, chains, ropes operatively connected to an electric or hydraulic winch. For example, the platform 910 may be lowered to various depths, such as 600 feet, 1000 feet or some other appropriate depth. The CAV 905 may supply energy to a variety of traction devices 911 connected to moving platform which may include wheels, tracks, and rollers. Traction devices 911 allow the platform 910 to use friction from interaction with ocean floor to move the platform 910.

The platform 910 may include various systems. In one embodiment the platform may include a mechanical seizure mechanism (MSM), such as, for exemplar, a water pump 912. The water pump 912 may water to flow near the ocean floor such that ocean garbage is moved into a first life protection machine (LPM) 913 contained within moving platform. The LPM 913 may separate marine plants and other living organisms from the water flow and may return the marine plants and living organisms to the bottom of ocean. The water pump 912 may also direct the water flow with ocean garbage towards CAV 905 via tube 914 (e.g., a flexible, plastic tube). Additionally, tube may contain an alternative mechanism for moving ocean garbage through tube to CAV. Alternative mechanism may include for example a screw conveyor.

In one embodiment, the MSM may direct ocean garbage to a first underwater container. The underwater container may be made buoyant via air inflation or attachment to an inflatable air container to provide sufficient buoyant forces. CAV 905 may collect the inflated air container containing the ocean garbage. In another embodiment, the underwater container may be made transferred to CAV 905 via a cable, chain, or rope operatively connected to a winch contained within CAV 905.

In some embodiments, a locator system may automatically identify areas with concentrations of plastic garbage on the bottom of ocean provide this information to the CAV 905. The CAV 905 and/or the MSM may move to that area to collect the garbage.

In one embodiment, the water pump 912 used to collect the ocean garbage may be oriented such that such that kinetic energy of water flow, after filtering out the garbage, provides a force for moving the CAV 905 in a particular direction. The water pump 912 may move the CAV 905 at a lower speed, such as 5 knots. Thus, the kinetic energy generated by pumping water (to move the garbage upwards) can also be used to move the CAV 905, which can help save fuel or energy.

Moving platform 910 maybe designed to separate (e.g., physical separate) from CAV 905. For example, moving platform 910 may be an autonomous underwater robot (AUR) where the AUR collects garbage in an inflatable container via a water pump, partially inflates said container such that container rises to ocean surface. The CAV 905 may collect said partially inflated container. In this example AUR utilizes an electrical battery, capacitor, or fuel cell to power the electric motors, communication systems and navigation system required for operation.

Figure 13:
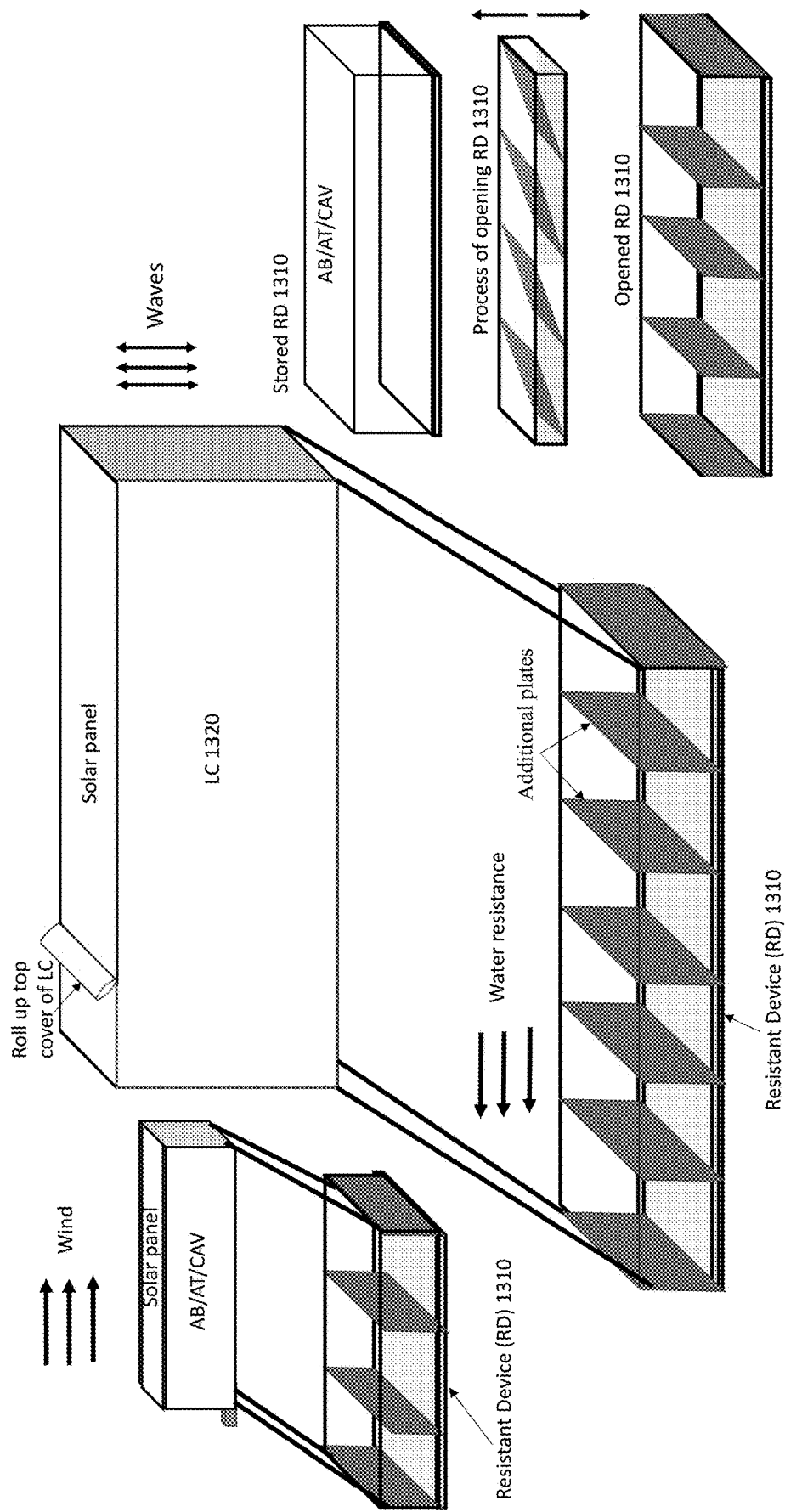
FIG. 13 is a diagram illustrating an example device and method for stabilization of a floating object from unwanted movement due to surface water motion, in accordance with one or more embodiments of the disclosure.
Figure 14:
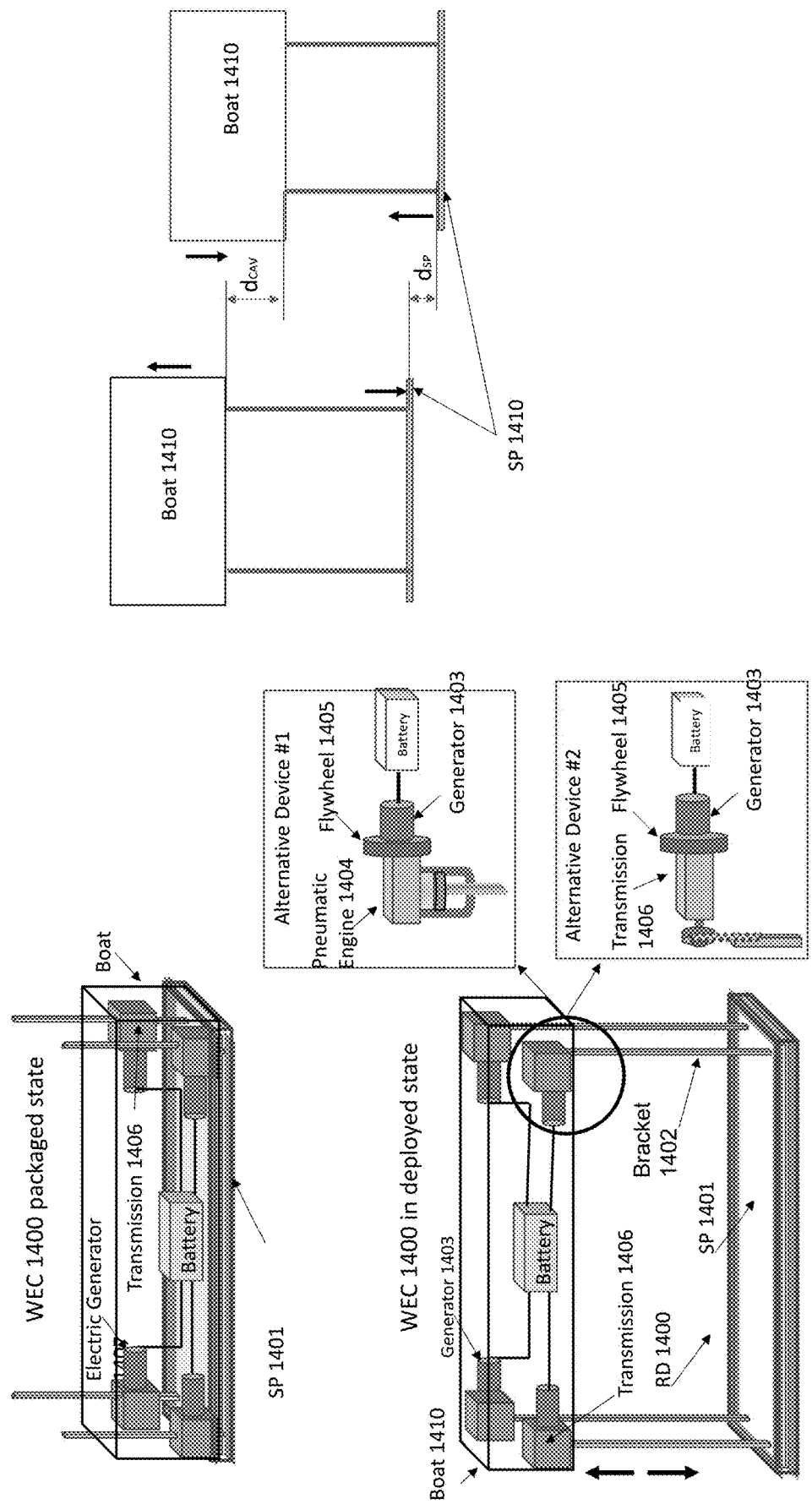
FIG. 14 is a diagram illustrating example a system and method of a wave energy converters (WEC), in accordance with one or more embodiments of the disclosure.

In one embodiment, the resistance device (RD) 916 on the top of platform allows to 910 may produce the energy as the part of a wave energy converter (WEC), described in FIG. 14. The RD 916 may also be used for stabilization other vehicles or vessels from unwanted movement due to the motion water at the surface of the ocean, as described in FIG. 13.

Figure 10:
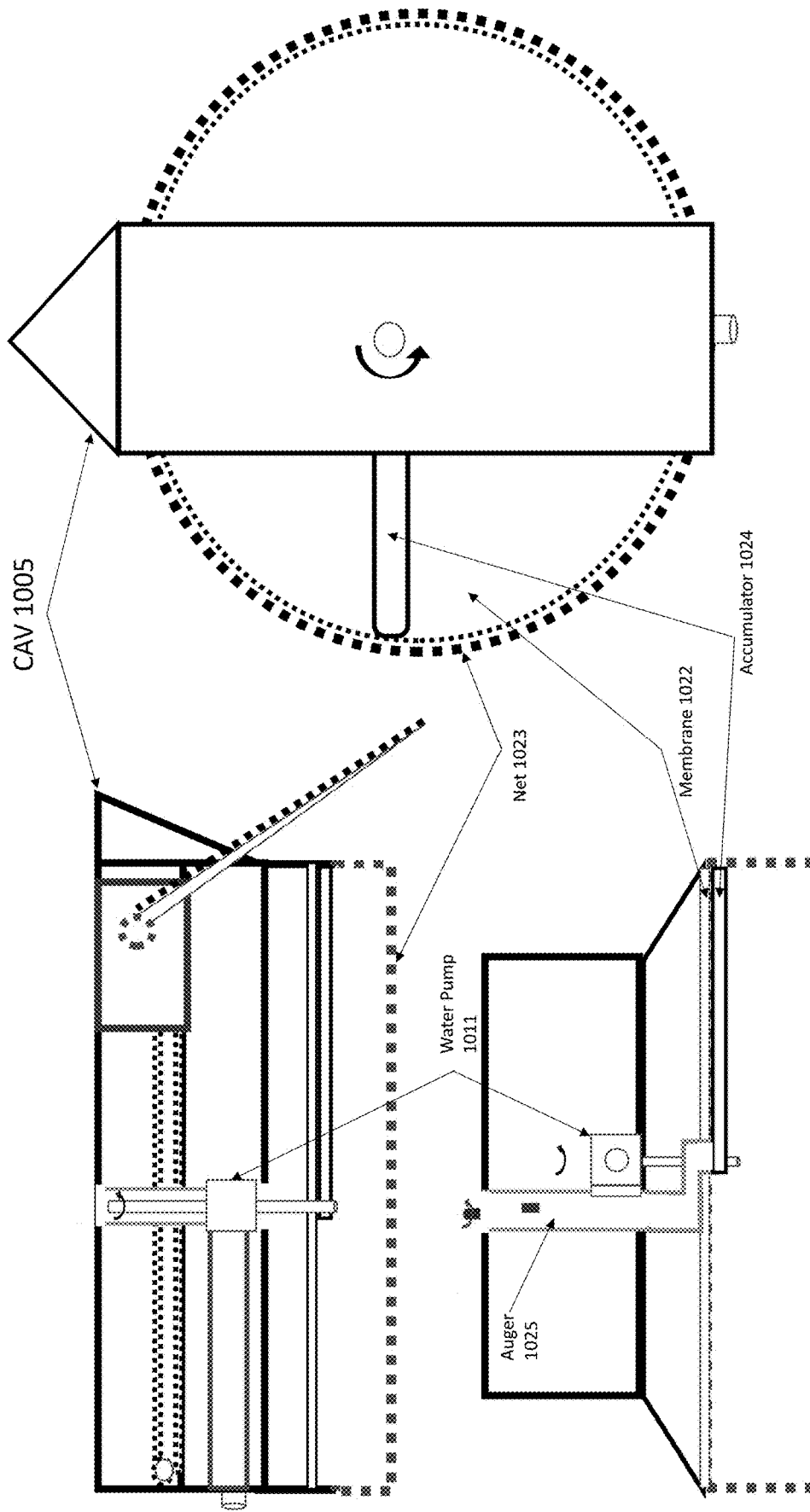
FIG. 10 is a diagram illustrating an example device and method for continuous accumulation of microplastics within ocean water, in accordance with one or more embodiments of the disclosure.

FIG. 10 is a diagram illustrating an example device and method for continuous accumulation of microplastics within ocean water, in accordance with one or more embodiments of the disclosure. Sensor data, satellite data, etc., may be processed by the OCAS (e.g., by server computers, cloud computers, etc.) to identify locations in the ocean that may have garbage, such as microplastics. Systems of the OCAS may instruct the CAV 1005 to move to that location. The CAV 1005 may include a water pump 1011. The water pump 1011 may move or pump ocean water from the location through at least one filter. The filter may be a porous material such that water flows through filter and microplastics are substantially restricted or prevent from flowing through said filter. Thus, the microplastics accumulates on or near the filter.

In one embodiment, the filter may be a membrane 1022. The membrane 1022 may be a sieve, woven cloth, metal cloth, metal plate that has holes formed within, etc. The membrane 1022 may be made from a variety of materials including metal, plastic, and combination thereof. The membrane 1022 may be located next to an accumulator 1024. The accumulator 1024 may be a rotatable connected elongated member which may be located in close proximity to filter. The accumulator 1024 may be rotated (as illustrated in the right side of FIG. 10), such that rotation of accumulator 1024 further accumulates microplastic along accumulator 1024. The accumulator 1024 may contain scrapers, brushes, bristles, or a doctor blade, to assist in further accumulation of microplastics. The accumulator 1024 moves accumulated microplastic towards a GC of CAV 1005. The movement of microplastics may be accomplish through the use of increased water flow and pressure, auger 1025, transfer belts, or conveyors. Additionally, water flow from water pump 1011 may be directed such that the kinetic energy of the water flow may be used to move the CAV 1005 in a predetermined direction.

In one embodiment, multiple of filters maybe used. For example, the net 1023 may be a second filter. The net 1023 may have larger holes than the membrane 1022 and may impede the flow of large objects and/or prevent oceanic creatures from contacting membrane 1022. For example, the net 1023 may have holes up to 2 inches in diameter while the membrane 1022 may have holes that are 0.05 inches in diameter.

In one embodiment, the water pump 1011 (that is used to collect ocean garbage) may be directed such that the kinetic energy of the water flow provides a force for moving CAV 1005 in a predetermined direction. The CAV 1005 may move at a speed of up to 5 knots. Therefore, kinetic energy of pumping water can also be used to move the CAV 1005 which may help save fuel or energy. In one embodiment, the membrane 1022 may be magnetized to attract and remove magnetic polymer and ferromagnetic materials from ocean water.

Figure 11:
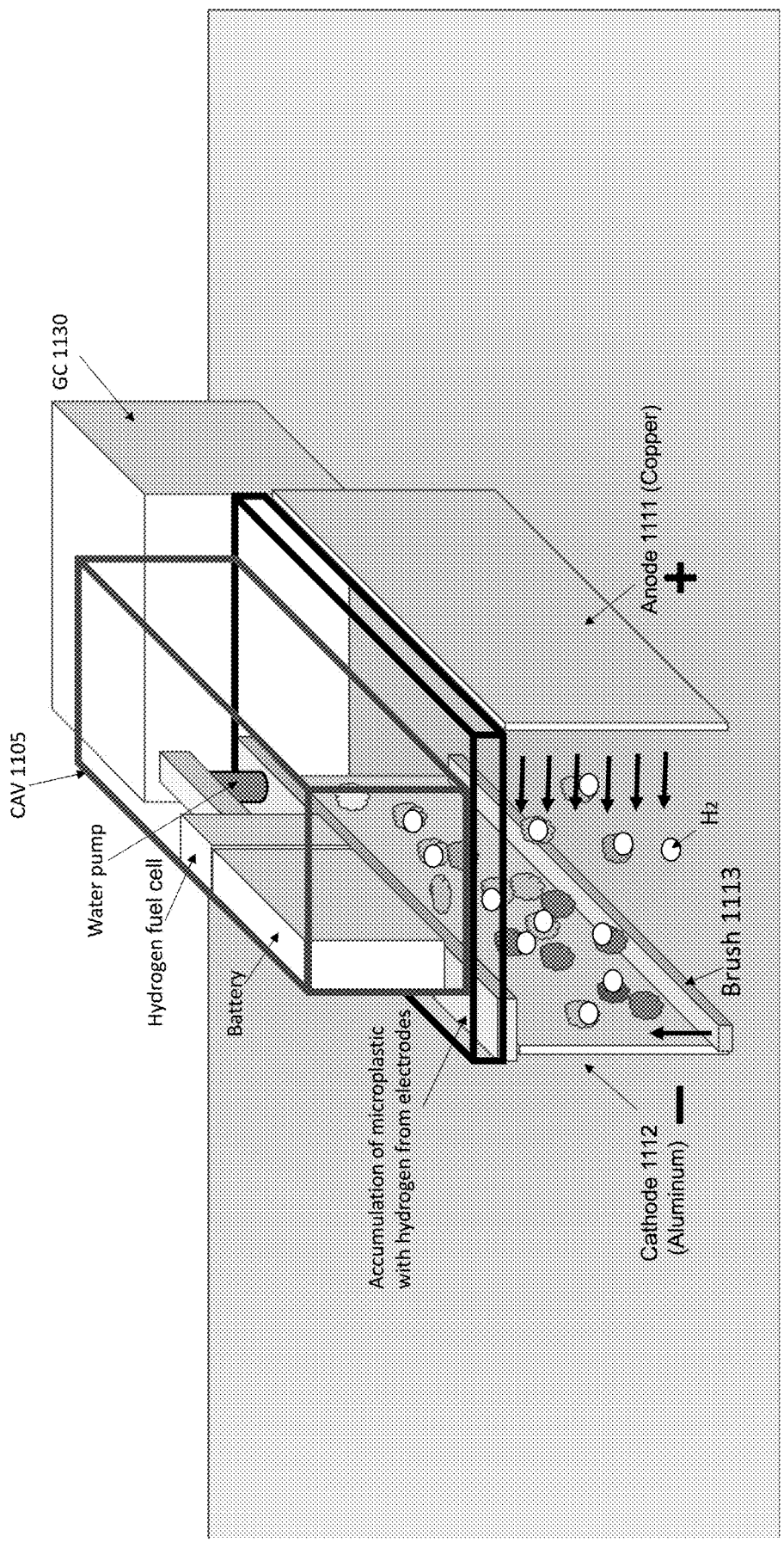
FIG. 11 is a diagram illustrating example device and method for accumulation of microplastics on electrodes, in accordance with one or more embodiments of the disclosure.

FIG. 11 is a diagram illustrating example device and method for accumulation of microplastics on electrodes, in accordance with one or more embodiments of the disclosure. Ocean water is inherently an electrolyte, and is capable of conducting electricity.

An anode 1111 and a cathode 1112 are suspended in ocean water that may have microplastics contained within. A sufficient electrical potential is applied to anode 1111 and cathode 1112, such that electrons on the microplastics become dislodged and the microplastics are attracted to cathode 1112. Cathode 1112 and anode 1111 may be made from a variety of conductive materials and/or metals, including aluminum, copper, stainless steel, and combinations thereof. The energy/power for creating the electrical potential may be supplied from various vessel and/or systems within the OCAS system including but not limited to: batteries, capacitors, generators, fuel cells, and solar cells, etc. Other secondary systems may be used to further accumulate and move the electrolyzed microplastics to a GC 1130 of a CAV 1105 for subsequent transportation. These systems include; mechanisms with brushes 1113, bristles, scrappers, high pressure water flows, and/or filter mechanisms. For example, a similar method is used in removing micro particles from air, commonly referred to as electrostatic precipitating air filters.

Figure 12:
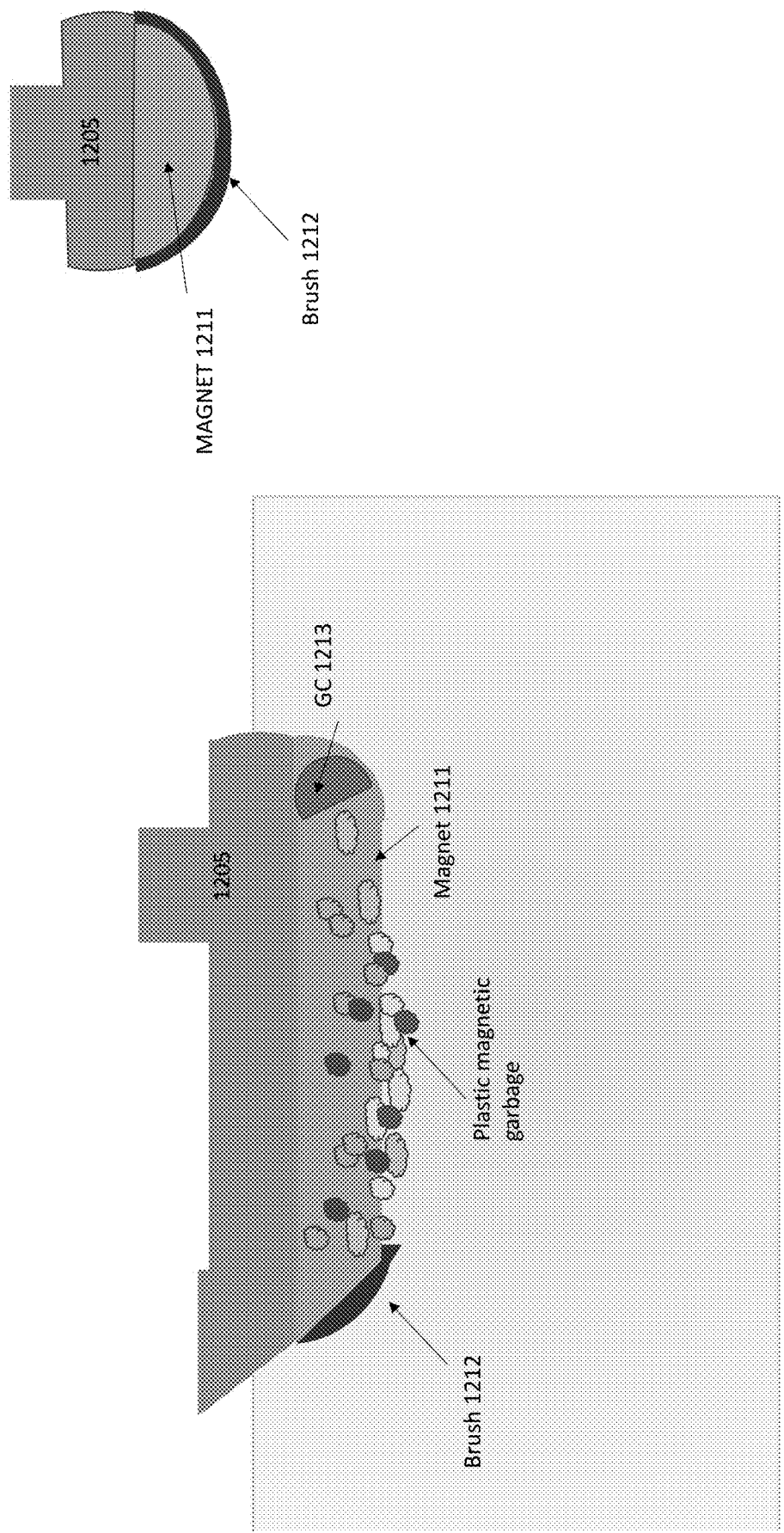
FIG. 12 is a diagram illustrating example of a system and method for magnetic accumulation of polymeric ocean garbage having magnetic particles, in accordance with one or more embodiments of the disclosure.

FIG. 12 is a diagram illustrating example of a system and method for magnetic accumulation of polymeric ocean garbage having magnetic particles, in accordance with one or more embodiments of the disclosure. Polymeric materials may be manufactured with magnetic properties. For example, ferromagnetic particles may be added to polymers during manufacture. A vessel 1205 (e.g., an oceanic vessel such as a boat) may have a hull or portion of hull with a magnet 1211 of sufficient strength to attract magnetic microplastic created from magnetic polymers. The magnet 1211 may be created by magnetizing portions of the hull, or having magnetic paint applied to the hull. Further, scrapers, brushes 1212, bristles, blades, and/or high pressure water flows and filter mechanisms may assist in further accumulation of magnetic polymers that are magnetically attached to magnetic hull. For example, brushes 1212 positioned on the hull and may move towards a the GC 1213.

OCAS may track data of magnetic hull vessels and amount of accumulated magnetic microplastics, where data is further used to incentivize use of additional magnetic hulls.

FIG. 13 is a diagram illustrating an example device and method for stabilization of a floating object from unwanted movement due to surface water motion, in accordance with one or more embodiments of the disclosure. According to the description, a resistance device (RD) 1310 provides an alternative to an anchor (which requires contact with an unmovable object such as the ocean floor).

In one embodiment, the RD 1310 includes a first plate (SP) of that is connected to a first vessel (e.g., an AB, an AT, a CAB, LC 1320, etc.) such that the first plate is suspended in the water under the vessel. The depth of the plate relative to the vessel may be changed. When the vessel is moving, the first plate may be attached to the bottom of vessel such that the first plate has minimal effect on the vessel's ability to move (e.g., such that the plate does not create much drag). When stability from surface wave motion is desired, the first plate is lowered into the water, for example, up to 100 feet below the surface of the water. Motion induced into vessel from surface waves is resisted through tension of the connection to first plate located within the water.

In one embodiment, the first plate may have one or more additional plates that are connected to the plate. The one or more additional plates may be rotate from a flat position to a perpendicular position (where the one or more additional plates are perpendicular to the first plate), as illustrated in the bottom left of FIG. 13. This may allow the one or more additional plates to resist horizontal motion of first plate while the first plate resists vertical motion.

In one embodiment, the first plate and/or the one or more additional plates may contain additional features to resist motion, such as small holes which create vortices in water flow. The one or more additional plates may rotate to a flat position. This may allow the first plate and the one or more additional plates to be attached to the bottom of a vessel, as discussed above.

In one embodiment, the RD 1310 may be attached to vessels, boats, floating platforms, NPs, CAVs, ATs, LCs, ABs and other OCAS's systems. The RD 1310 may also be used for producing energy as part of a wave energy converters (WEC), as described in FIG. 14.

FIG. 14 is a diagram illustrating example a system and method of a wave energy converters (WEC) 1400, in accordance with one or more embodiments of the disclosure. The energy is captured from the motion of ocean waves using a resistance device (RD), such as SP 1401. The WEC 1400 includes a plate (e.g., a heavier metal plate) SP 1401. The SP 1401 (e.g., the plate) is coupled to the boat 1410 (or some other vessel, such as a CAV, AT, AB, etc.) via one or more brackets 1402. The brackets 1402 may be extendable to lower or raise the SP 1401.

The relative motion deltas between the WEC 1400 and boat 1410 are used to generate energy via one or more energy production devices. For example, energy production devices may include a generator 1403, a hydraulic pump, a pneumatic engine/pump, a compressor, piezo electric material, or fly wheels 1405. Additionally, other devices may also be operatively connected, such as transmission 1406, springs, and linking devices (e.g., chains, gears, pulleys, etc.). Energy may be stored as electrical energy, chemical energy, kinetic energy, or a compressed fluid. The energy produced by the WEC 1400 may be stored in a battery.

The movement of the boat 1410 (and other vessels or vehicles in the OCAS) may be relatively slow, for example, less than 5 knots. The WEC 1400 (e.g., the SP 1401) may be lowered to a depth such that WEC 1400 does not substantially affect the slower movement of the boat 1410 (or other vessels) under normal operation. When the speed of boat 1410 increases due to high wind or other environmental influences, the WEC 1400 may resist unwanted motion while additionally capturing and storing energy which may be used by the boat and/or by other components/systems of the OCAS.

The source of the power generated by the WEC 1400 may be due to the difference/delta between the inertial movement of SP 1401 under the water and the movement of the boat 1410 on the waves. The water resists the up and down movement of the SP 1410. Because the distance between boats and balance device is changing, this may cause the brackets 1402 to move a transmission 1406 via the flywheels 1405, which are connected to an electric generator 1406. The electrical power may be stored in the battery and the battery may provide power for other the boat 1410 or other systems/vessels of the OCAS. The bottom left portion of FIG. 14 illustrates the position of WEC 1400 when the WEC 1400 is in a deployed state. The top left portion of FIG. 14 illustrate the position of WEC 1400 when the WEC 1400 is in a stowed or stored state.

The middle portion of the FIG. 14 illustrates different systems that may be used to generate power. For example, the movement of the SP 1401 may power by a pneumatic engine 1404 which may operate in conjunction with the flywheel 1405 and the electric generator 1403 to generate power. In another example, the movement of the SP 1401 may operate a transmission 1406 which may operate in conjunction with the flywheel 1405 and the electric generator 1403 to generate power. The power that is generated may be stored in batteries, capacitors, fly wheels, or pressure tanks. Also, WEC 1400 may be used for stabilization of a floating boats from unwanted movement due to surface water motion, as described in FIG. 13.

Figure 15:
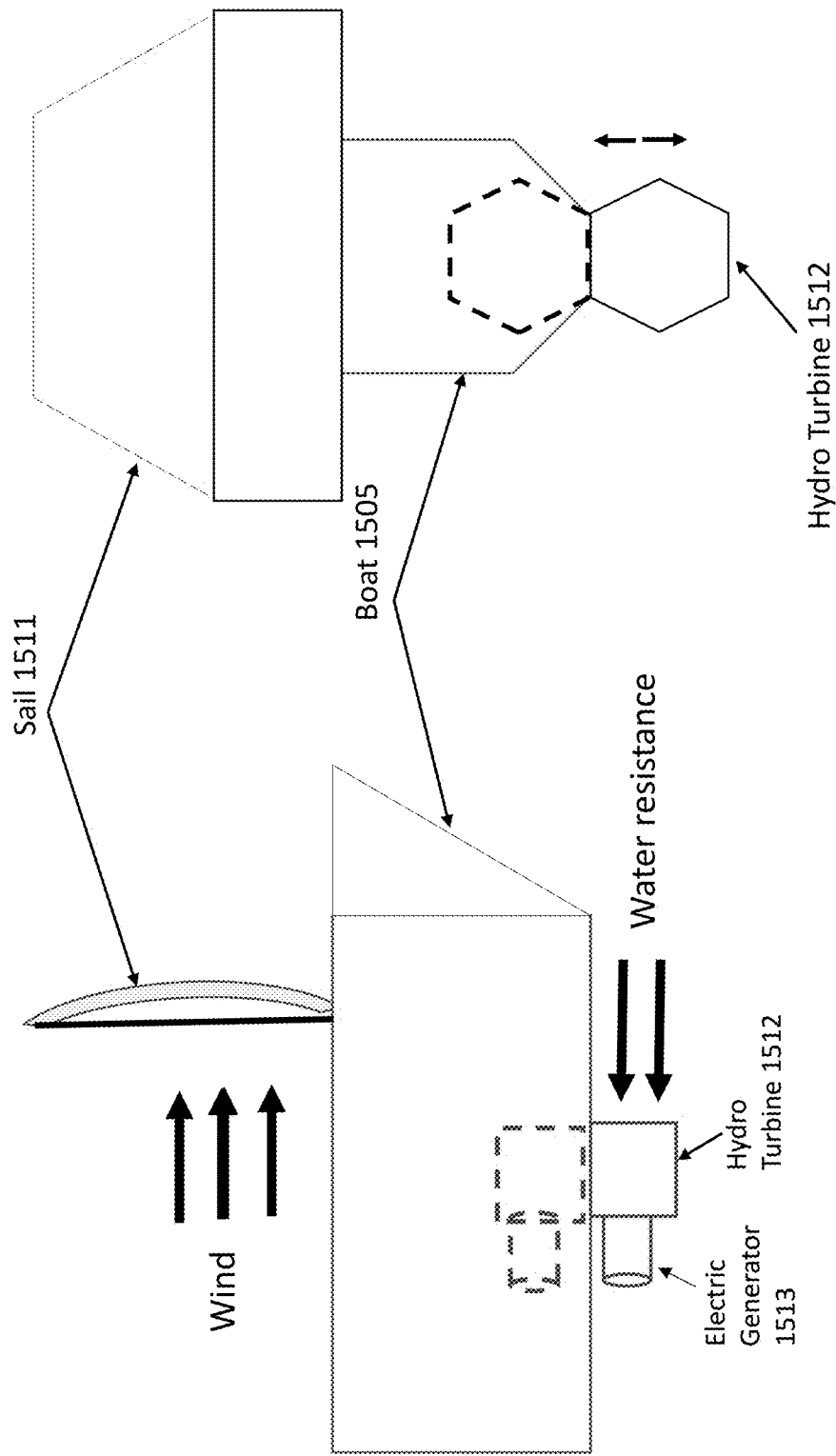
FIG. 15 is a diagram illustrating an example a system and method for generation electricity from wind powered vessels with hydro turbines, in accordance with one or more embodiments of the disclosure.

FIG. 15 is a diagram illustrating an example a system and method for generation electricity from wind powered vessels with hydro turbines, in accordance with one or more embodiments of the disclosure. A substantially large surface, such as a sail 1511 operatively connected to a boat 1505 (or some other vessel/vehicle) such that the sail 1511 captures the force/energy generated by wind and uses the force/energy to move the boat 1505. At least one hydro turbine 1512 attached to vessel such that hydro turbine 1512 resists the movement of the boat 1505 caused by the wind. hydro turbine 1512 may be operatively connected to a generator 1513, fly wheel, or compressor to store energy as electrical energy, chemical energy, kinetic energy, or a compressed fluid. The hydro turbine 1512 may reduce unwanted movement of the boat 1505, such as in a storm. The energy produced by the hydro turbine 1512 and the generator 1513 may be stored in a battery. The hydro turbines 1512 may be attached to vessels, boats, floating platforms, NPs, CAVs, ATs, LCs, ABs and other floating objects.

Figure 16:
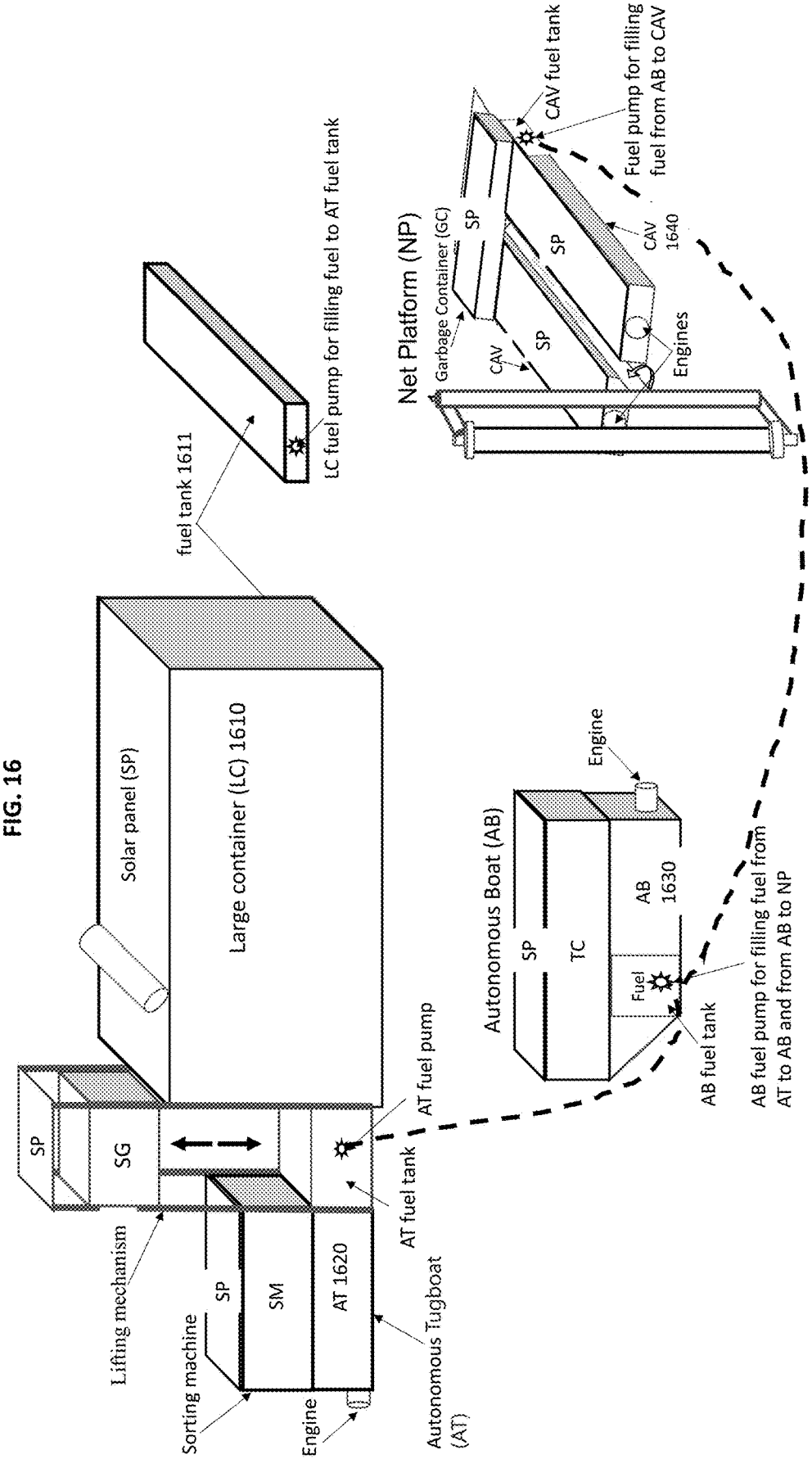
FIG. 16 is a diagram illustrating example method of supplying fuel for OCAS vessels, in accordance with one or more embodiments of the disclosure.

FIG. 16 is a diagram illustrating example method of supplying fuel for OCAS vessels, in accordance with one or more embodiments of the disclosure. A first LC 1610 having fuel contained within a fuel tank may receive a destination/target location from a server of the OCAS. The destination/target location is also made available to at least one standard ocean vessels (ROV), such as a shipping vessel, a freighter, etc. The ROV may transport the LC 1610 (e.g., tow the LC 1610) as ROV travels to a destination port. The expected route of the ROV may be near the destination/target location of LC 1610. The matching of an ROV with the destination/target location may be achieved through the bidding process illustrated in the FIG. 18. The bidding process and system may help minimize delivery cost of LC 1610 to the destination/target location.

In one embodiment, because the LC 1610 is moved to the point/port of destination by an ROV that is traveling by the destination/target location, the cost of delivering the LC 1610 ($\Delta\$LC$) is equal to the cost of delivery LC ($\$LC$) minus the cost of ROV's own travel to the destination port of the ($\$ROV$), as illustrated by the following equation: $\Delta\$LC=\$LC-\$ROV$. Fuel contained within LC 1610 (E.g., stored in fuel tank 1611) may be used by other vessels, vehicles, etc., in the OCAS. For example AT 1620 may pump fuel from the LC 1610. In another example, may be further transferred to AB 1630, CAVs 1640, and NP 1650. AB 1630 may pump fuel from AT 1620 to fuel tank located in AB 1630. AB 1630 may deliver fuel from AT 1620 to CAVs 1640.

In one embodiment, the amount of fuel contained within LC 1610 may be the minimal amount needed by the different vessels/systems of the OCAS. For example, the amount of fuel loaded into LC 1610 may be no more than the required fuel needed to accumulate the sorted garbage into LC 1610, minus renewable energy generated by various systems such as solar panels, plus an additional amount needed as a backup due to storms and other events. By continuing to gather data on fuel usage by the vessels/vehicles of the OCAS, adjustments to amount of fuel can be made to increase efficiency and further lower costs. For example, renewable energy generated by OCAS vessels may include solar, WEC, and wind powered vessels with hydro turbines. Additionally, unexpected garbage may increase required fuel needed. Thus, the proposed method makes it easier to balance the required amount of fuel in real time with regular changes in conditions.

OCAS systems may analyze the amount of remaining fuel in tank after delivering the LC 1610 load with garbage (such as sorted plastic garbage) to a port of destination. As renewable energy system within OCAS improve, such as better or more efficient solar panels, OCAS may reduce the amount of fuel supplied with LC 1610. This effectively achieves a self-regulated system, where upgrades are automatically compensated for by adjusting the amount of fuel supplied with LC 1610. This may also work for number of vessels. For example, a SM may only be able to sort garbage from 2 CAVs. However, if a larger capacity SM is deployed, additional CAVs maybe also deployed.

OCAS vessels, including LC 1610 may utilize existing safety regulations and restrictions for fuel tanks of ocean vessels. Current types of fuel that may be used for OCAS include: diesel fuel, marine gas oil, marine diesel oil, gasoline, biofuels, bio-diesel, low sulfur fuel oils, ultra-low sulfur fuel oils, distillate fuels, emulsified fuels, liquefied natural gas, and other commonly used fuels for ocean vessels. The use of common fuels allows OCAS to supply fuel through existing fueling infrastructure in ports.

Figure 17:
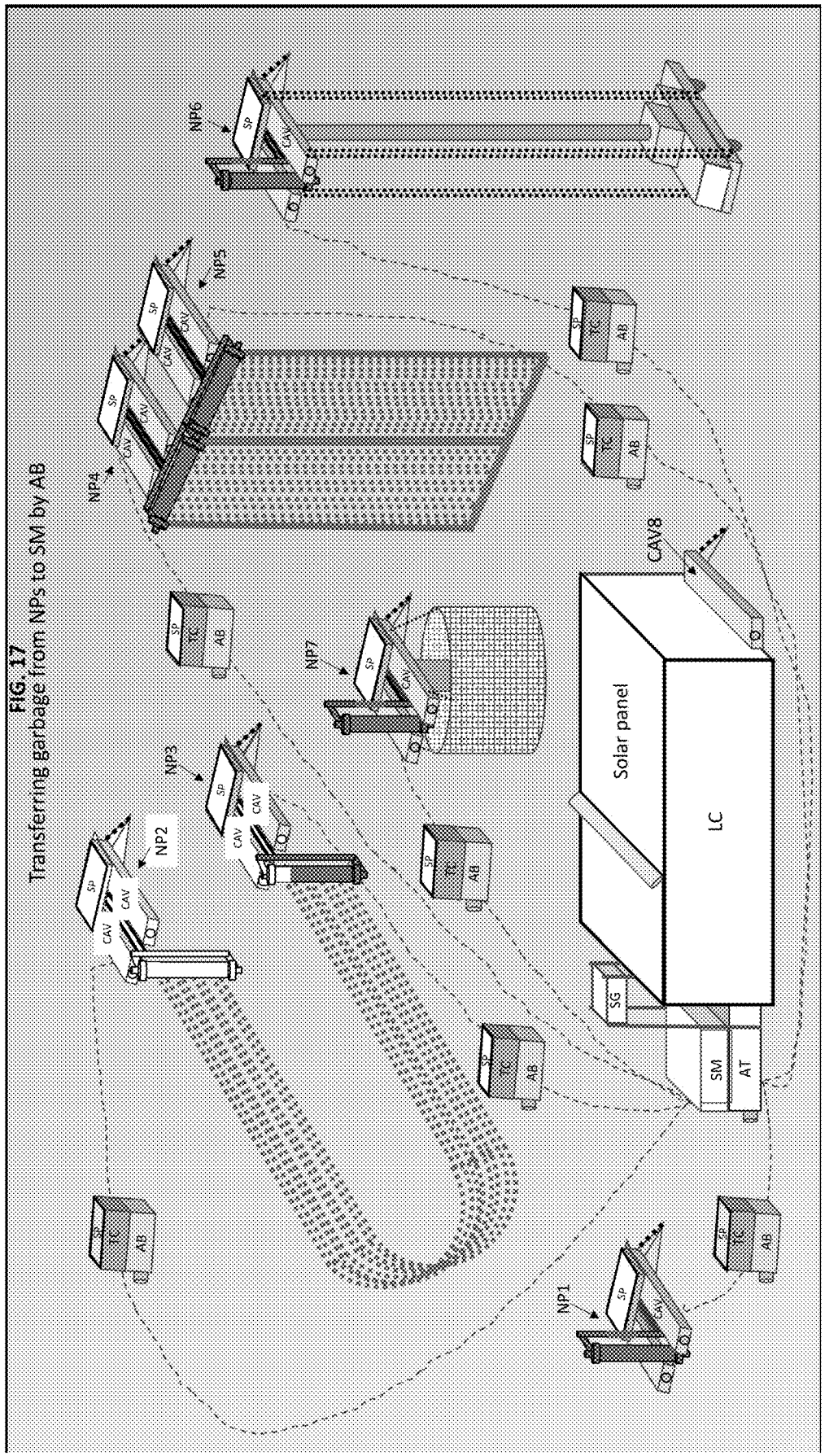
FIG. 17 is a diagram illustrating an example an interdependent system of operation of OCAS, in accordance with one or more embodiments of the disclosure.

FIG. 17 is a diagram illustrating an example an interdependent system of operation of OCAS, in accordance with one or more embodiments of the disclosure. The system includes various CAVs, NPs, ABS, ATs, SMs, and LCs. FIG. 17 illustrates the collection of garbage by a CAV with various mechanisms/systems. The OCAS design allows to involve many NPs and ABs for collecting ocean garbage in one LC with one SM. For example, the FIG. 17 illustrates the collection of different types of garbage with different mechanisms and equipment.

NP1 may be a single NP that is collecting garbage on surface with a seizure conveyer mechanism (SCM). The bobbin with a net is lifted up and is not being used by NP1. NP2 and NP3 may be a pair of NPs that are collecting garbage on surface with their combined nets. The bobbins of NP2 and NP3 are down/deployed with the combined nets deployed closer to the surface of the water. NP4 and NP5 may be a pair of NPs that are collecting garbage in deeper waters. The bobbins of NP4 and NP5 are down/deployed with the combined nets deployed down below the surface of the water. NP6 may be a single NP is collecting garbage on bottom of ocean (e.g., on the ocean floor). NP7 may collect microplastic by using filters, electrodes, magnets/magnetic devices. The bobbin of NP7 is lifted up and is not being used by NP7. CAV8 may be a replacement CAV that is not currently used and may be a backup in case one of the CAVs fails or is damaged.

OCAS has one sorted machine, which located on Autonomous Tugboat (AT). The sorted plastic garbage storing the in LC with any type of lifting mechanism which, for exemplar, illustrated in FIG. 7,8,16.

The AT connected and moving LC to following the OCAS's movement.

ABs transport the collected waste to the sorting machine from CAVs. The number of ABs vary from one to many and depends on the speed of garbage collection by CAVs and the speed of sorting and storing of sorted plastic in LC.

Figure 18:
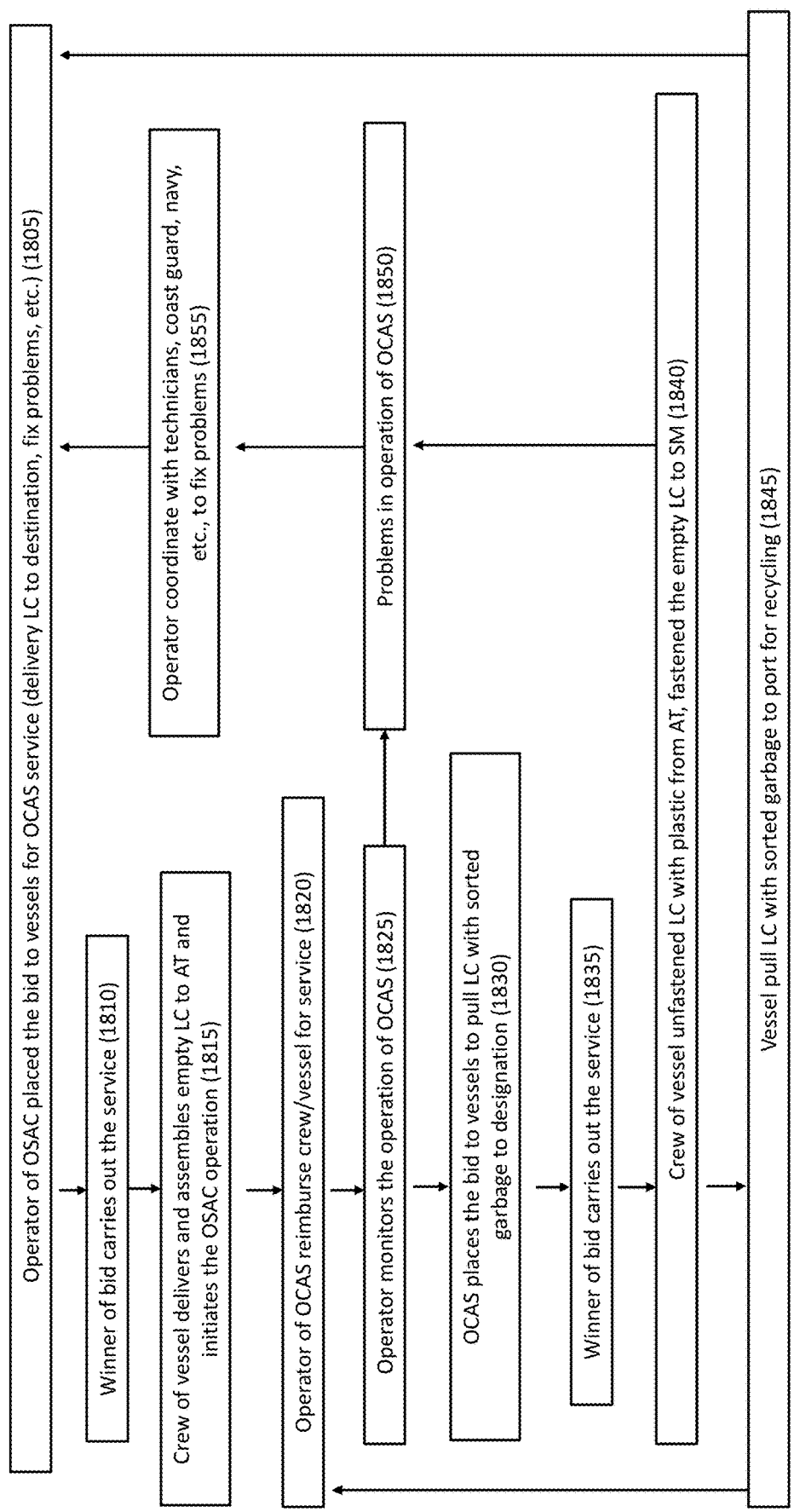
FIG. 18 is a diagram illustrating example management and operation of the OCAS, in accordance with one or more embodiments of the disclosure.

FIG. 18 is a diagram illustrating example management and operation of the OCAS, in accordance with one or more embodiments of the disclosure. The OCAS may maintain a system of autonomous machines, including CAVs, ABS, ATs, LCs, SMs. The OCAS may keep these machines, systems, devices, etc., in working order and coordinate the delivery of the garbage (e.g., plastic garbage), stored in LCS, to destination ports. The OCAS may communicate with, receive bids for, and instruct a variety of marine vessels to perform various actions, operations, services, etc.

The OCAS may deliver vessels to new locations in the ocean, such as ocean garbage patches, contaminated ocean locations, mine fields, sunken vessels, and other locations requiring cleaning. The OCAS may also deliver new and/or empty LC to a predetermined location of OCAS operation. The OCAS may also deliver an LC with sorted garbage to port of destination to recycle, reuse, compost, incinerate, store, dispose of, and for other further processing or transportation. The OCAS may also fix problems with OCAS vessels or systems. For example, the OCAS may replace damaged equipment or mechanisms, deliver professional crew for repairs, upgrade equipment or mechanisms, and any other services deemed necessary for operation and/or efficiency improvements (e.g., adding or replacing solar panels with more efficient solar panels). The OCAS may communicate with a variety of data analysis and data calculation systems, such as artificial intelligence or machine learning systems. The cycle of operations performed by the OCAS may be adjusted and/or automated as OCAS system collects data about operations.

At block 1805, the operator of the OCAS receives bids to deliver an LC (e.g., an empty LC) to a location on the ocean (or some other body of water such as a lake, river, bay, etc.). The OCAS may compares bids and may select a winning bid based on various data, criteria, parameters, within OCAS systems. For example, a bid may be selected based on the capability of vessels and/or crew. For example, any ocean vessel, which has the ability to pull the LC, may place the bid for delivery LC to destination. However, the OCAS may select a vessel that has faster speed or longer range. The OCAS may also determine the price of other bids received, and the location and movement of OCAS vessels, including but not limited to LCs, ATs, ABS, CAVs. The OCAS may also determine the garbage type and the amount contained within the LC. The OCAS may also determine the duration of a route and anticipated costs. For example, OCAS system may accept a higher bid to pay the extra costs for an additional planned route at the moment of bidding, where the actual completed transaction may be calculated based on the actual route of delivery of the LC to destination port. This may be determined automatically based on the data received from location data systems, such as GPS systems, after the LC is delivered. The OCAS may also determine the time since a prior operation. For example, the time since last delivery of the LC, the time since last delivery to port, or the time since last bid received may be determined. The LC with accumulated sorted plastic may float passively while waiting for a lower bid amount. The OCAS may also determine various external data, such as commodity price for plastic garbage contained within LC.

The OCAS selects a winning bid such that said bidding process generally minimizes the cost of providing services for the OCAS. For example, OCAS system announces request for the provision of OCAS services by regular ocean-going vessels. This may include is the delivery of LC to the destination. The OCAS may accept the bid with the lowest cost of service or based on other conditions. The OCAS operator may work remotely and there may be many OCAS operators in different locations.

The winning bid may be from a vessel with a route substantially similar to the desired destination route of the LC to minimize the fuel and therefore cost of pulling the LC to destination. Bids may include one of several operations or services. For example, the operator may request a bid to deliver an empty LC to a first destination and deliver a second LC with accumulated sorted plastic garbage to a second destination. Alternatively, the operator may request bid only to delivery empty LC to the first destination. The LC may contain the various devices. For example, the LC may include a top or cover which automatically covers LC after the accumulation of sorted plastic garbage or in case of storm. The cover may be ridged or flexible such that the cover can be rolled and stored. The cover may additionally contain closures such as a zipper. The LC may also include one or more signaling devices to notify people and vessel in close proximity to said LC (e.g., flashing lights, radio signals, warning beeps, etc.).

Once a bid to perform a service for OCAS system is accepted, the winner of the bid may perform or carry out various services at block 1810. For example, at block 1815, the winner of the bid may optionally assemble the LC, if the LC was not previously assembled. The crew of vessel of winning bid may attach the LC with ropes, chains, ties, straps, or other anchoring devices, to vessel of the winning bid. The LC may include a fuel tank with fuel. The vessel tows, pushes, or transports LC to a predetermined destination location. The LC may be disconnected from the vessel at the destination. The OCAS may reimburse the vessel or crew for towing the empty LC to the destination at block 1820.

At block 1825, the OCAS may monitor operations. For example, an AT may connect to the LC. The AT may couple with the LC before or after the LC is disconnected from vessel that towed the LC. The crew of the vessel of winning bid may couple LC and AT. Alternatively, the AT and LC may couple through electro-mechanical devices automatically.

At block 1835, the OCAS places a bid for vessels to pull a second LC with garbage to another destination. A different vessel (or the same vessel that towed the first LC) may win the bid and may further commence services as indicated in bid submission at block 1835. For example, the crew may attach the second LC (with accumulated sorted plastic garbage contained within), with ropes, chains, ties, straps, or other anchoring devices, to the vessel. The vessel carries out the service at block 1835. The vessel may uncouple the loaded LC from an AT and may optionally couple an empty LC to an SM at block 1840. For example, the same vessel may be used to deliver the empty LC and pick up a loaded LC (e.g., a LC that is full of garbage). The vessel tows, pushes, or transports said second LC with accumulated sorted plastic garbage contained within, to a port of destination at block 1845.

At block 1850, the OCAS may detect problems with one or more systems of the OCAS. For example, a CAV may malfunction, an LC may become damaged, etc. At block 1855, the OCAS may optionally coordinate with technicians, a coast guard, a navy (e.g., naval vessel), or other entities to address the problems.

Figure 19:
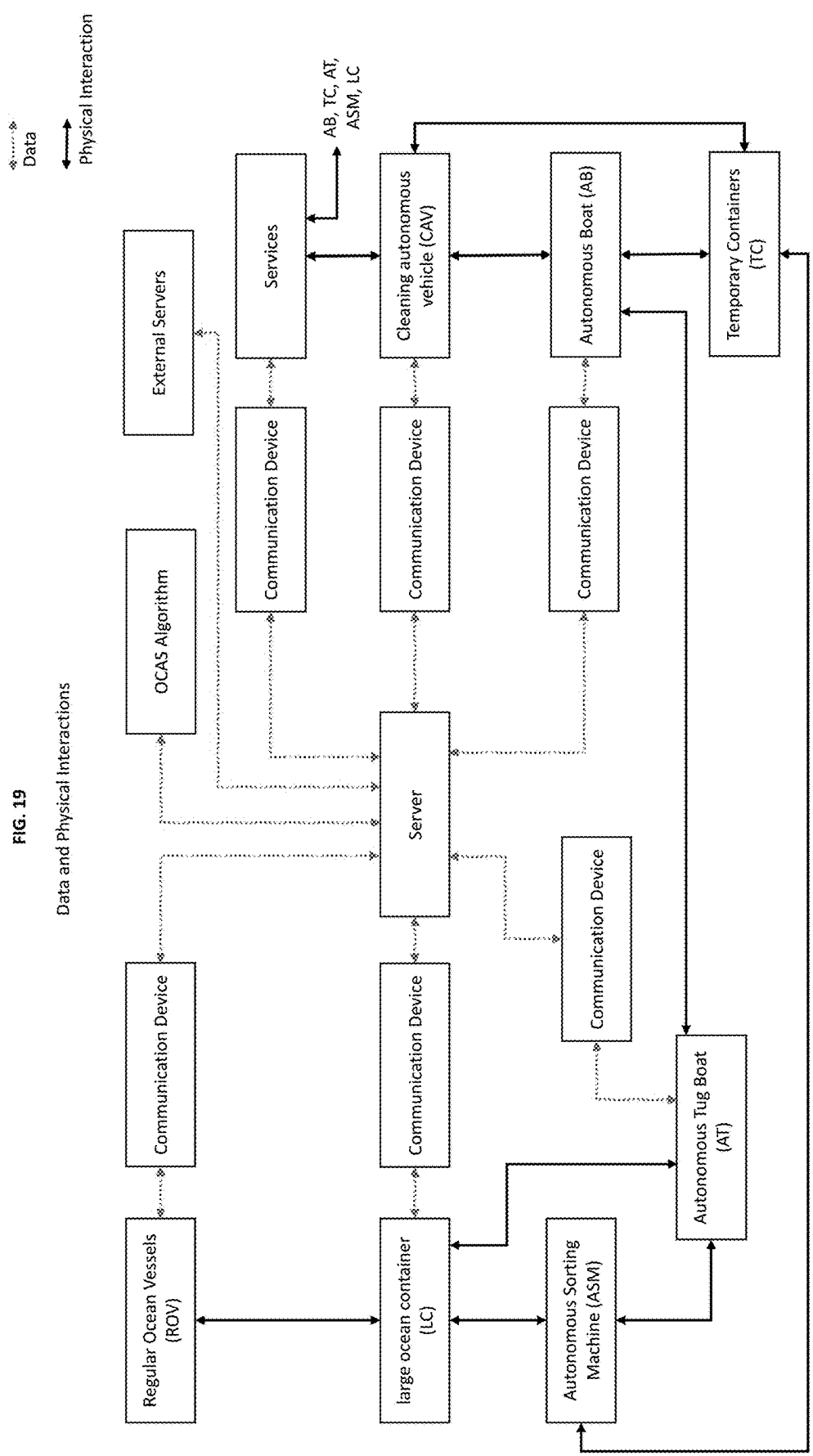
FIG. 19 is a diagram illustrating example data and physical interactions of OCAS systems, in accordance with one or more embodiments of the disclosure.

FIG. 19 is a diagram illustrating example data and physical Interactions of OCAS systems, in accordance with one or more embodiments of the disclosure. The OCAS systems may be distributed across a server or multiple servers, such that sever(s) relay information and/or data to a communication device. The communication devices may be used to communicate with vessels/systems of the OCAS system, including but not limited to, regular ocean vessels (e.g., cargo ships, freighters, etc.), LCs, ATs, CAVs, ABs, and SM.

The different segments of OCAS may communicate with Server(s) through additional communication devices, or through operatively coupling with an OCAS vessels. Various physical interaction may occur between vessels of OCAS. For example, an AB may couple to a TC, and may move the TC with garbage from a CAV to a SM. The AT may decouple the SM from the LC, such that LC with accumulated sorted garbage is coupled to an ROV for transport to a destination port.

Figure 20:
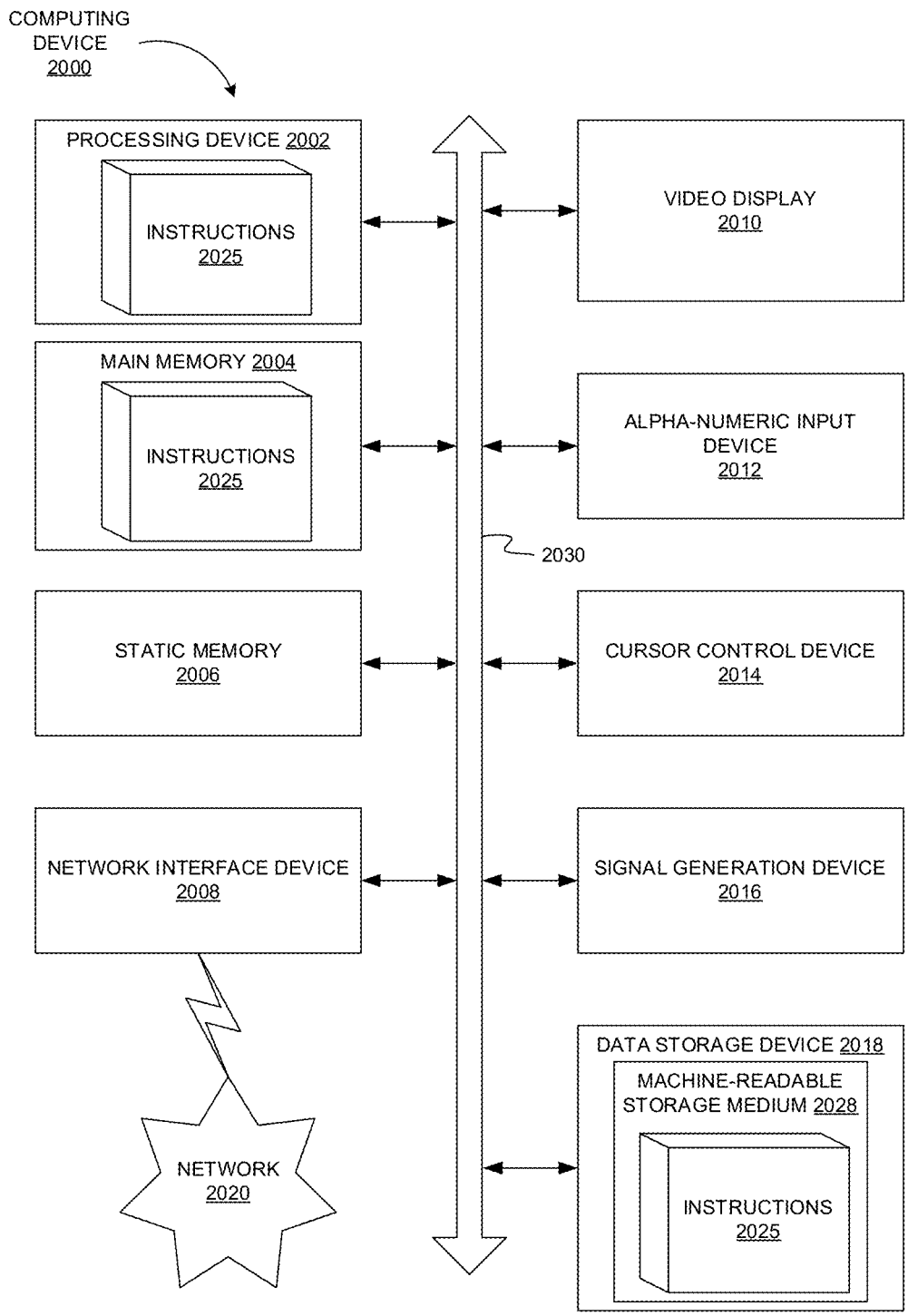
FIG. 20 is a block diagram of an example computing device 2000, in accordance with one or more embodiments of the disclosure.

FIG. 20 is a block diagram of an example computing device 2000, in accordance with one or more embodiments of the disclosure. Computing device 2000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. The computing device 2000 may be a server computer used by the OCAS. The computing device 2000 may also be located on various vessels/vehicles in the OCAS to control the operations of the vessels/vehicles (e.g., allow the vessels/vehicles to operate autonomously).

The example computing device 2000 may include a processing device (e.g., a general purpose processor, a programmable logic device (PLD), etc.) 2002, a main memory 2004 (e.g., synchronous dynamic random access memory (DRAM), read-only memory (ROM)), a static memory 2006 (e.g., flash memory), and a data storage device 2018), which may communicate with each other via a bus 2030.

Processing device 2002 may be provided by one or more general-purpose processing devices such as a microprocessor, central processing unit, or the like. In an illustrative example, processing device 2002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 2002 may also comprise one or more special-purpose processing devices such as an application specific integrated circuit (ASIC), a field programmable gate array (FPGA), a digital signal processor (DSP), network processor, or the like. The processing device 2002 may be configured to execute the operations described herein, in accordance with one or more aspects of the present disclosure, for performing the operations and steps discussed herein.

Computing device 2000 may further include a network interface device 2008 which may communicate with a network 2020. The computing device 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse) and an acoustic signal generation device 2016 (e.g., a speaker). In one embodiment, video display unit 2010, alphanumeric input device 2012, and cursor control device 2014 may be combined into a single component or device (e.g., an LCD touch screen).

Data storage device 2018 may include a computer-readable storage medium 2028 on which may be stored one or more instructions 2025, e.g., instructions for carrying out the operations described herein, in accordance with one or more aspects of the present disclosure. Instructions 2025 may also reside, completely or at least partially, within main memory 2004 and/or within processing device 2002 during execution thereof by computing device 2000, main memory 2004 and processing device 2002 also constituting computer-readable media. The instructions 2025 may further be transmitted or received over a network 2020 via network interface device 2008.

While computer-readable storage medium 2028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An ocean cleanup autonomous system, comprising:
a vehicle system, that travels to different locations on a body of water along a shoreline or offshore and to operate autonomously;
a collection system, coupled to the vehicle system, the collection system that collects garbage from one or more of the surface of the body of water, within the body of water, or the shoreline;
a sorting system that sorts the garbage into biodegradable garbage and non-biodegradable garbage and the non-biodegradable garbage is stored and the biodegradable garbage is returned to the body of water;
an accumulation system that accumulates the sorted non-biodegradable garbage onto a container or a barge; and
a power generation system that generates power for one or more of the vehicle system, the collection system, the sorting system, and the accumulation system.

2. The ocean cleanup autonomous system of claim 1, wherein the sorting system is coupled to one or more of the vehicle system and a container for storing the garbage.

3. The ocean cleanup autonomous system of claim 1, wherein the collection system comprises one or more conveyor belts configured to move the garbage from the body of water towards the vehicle system.

4. The ocean cleanup autonomous system of claim 1, further comprising a resistance device configured to decrease an amount of movement of the vehicle system, during a storm, on the surface of the body of water.

5. The ocean cleanup autonomous system of claim 1, further comprising an autonomous transfer systems configured to perform one or more of:
deliver fuel to the vehicle system from a container or barge; and
deliver trash from a container coupled with the vehicle system and the sorting system.

6. The ocean cleanup autonomous system of claim 5, further comprising an ocean vessel configured to couple to the container and to move the container with sorted garbage from an area of operation to a port of destination or the empty container with fuel for system to the area of
system operation from port, wherein the ocean going vessel is selected on the basis of a bidding process between available vessels with similar routes to the delivery of the container to the system, the winner of a bid is instructed to move the container, and the container is decoupled from the vehicle system after an amount of garbage in the container has reached a threshold amount.

7. The ocean cleanup autonomous system of claim 1, wherein the power generation system is configured to generate additional power from wind.

8. The ocean cleanup autonomous system of claim 1, wherein the power generation system is configured to generate additional power from waves in the body of water.

9. The ocean cleanup autonomous system of claim 1, further comprising a container configured to store the sorted garbage collected by the collection system.

10. The ocean cleanup autonomous system of claim 1, wherein the container comprises a leveling device configured to level the garbage as the garbage is deposited into the container.

11. The ocean cleanup autonomous system of claim 1, wherein the power generation system is configured to generate power from fuel delivered in fuel tanks of large containers delivered from a port to an area of system operation.

* * * * *